United States Patent
Kobayashi et al.

(10) Patent No.: US 9,999,955 B2
(45) Date of Patent: Jun. 19, 2018

(54) POLISHING APPARATUS AND POLISHED-STATE MONITORING METHOD

(71) Applicant: EBARA CORPORATION, Tokyo (JP)

(72) Inventors: Yoichi Kobayashi, Tokyo (JP); Katsuhide Watanabe, Tokyo (JP); Yoichi Shiokawa, Tokyo (JP); Keita Yagi, Tokyo (JP); Masaki Kinoshita, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days. days.

(21) Appl. No.: 14/327,522

(22) Filed: Jul. 9, 2014

(65) Prior Publication Data

US 2015/0017887 A1 Jan. 15, 2015

(30) Foreign Application Priority Data

Jul. 11, 2013 (JP) ................................ 2013-145734
Jul. 19, 2013 (JP) ................................ 2013-150507

(51) Int. Cl.
*B24B 37/013* (2012.01)
*G01B 11/06* (2006.01)

(52) U.S. Cl.
CPC ........ *B24B 37/013* (2013.01); *G01B 11/0625* (2013.01); *G01B 11/0683* (2013.01); *G01B 11/0691* (2013.01)

(58) Field of Classification Search
CPC .............. B24B 37/013; G01B 11/0625; G01B 11/0683; G01B 11/0691
See application file for complete search history.

(56) References Cited

U.S. PATENT DOCUMENTS

| | | | | |
|---|---|---|---|---|
| 6,102,775 A | * | 8/2000 | Ushio | B24B 37/013 451/41 |
| 6,969,619 B1 | * | 11/2005 | Winniczek | G01N 21/73 257/E21.218 |
| 7,119,908 B2 | * | 10/2006 | Nomoto | B24B 37/013 356/504 |

(Continued)

FOREIGN PATENT DOCUMENTS

| | | |
|---|---|---|
| CN | 1471726 A | 1/2004 |
| CN | 1622289 A | 6/2005 |

(Continued)

*Primary Examiner* — Marc Carlson
(74) *Attorney, Agent, or Firm* — Baker & Hostetler LLP

(57) ABSTRACT

A polishing apparatus capable of achieving a highly-precise polishing result is disclosed. The polishing apparatus includes an in-line film-thickness measuring device configured to measure a film thickness of the substrate in a stationary state, and an in-situ spectral film-thickness monitor having a film thickness sensor disposed in a polishing table, the in-situ spectral film-thickness monitor being configured to subtract an initial film thickness, measured by the in-situ spectral film-thickness monitor before polishing of the substrate, from an initial film thickness, measured by the in-line film-thickness measuring device before polishing of the substrate, to determine a correction value, add the correction value to a film thickness that is measured when the substrate is being polished to obtain a monitoring film thickness, and monitor a progress of polishing of the substrate based on the monitoring film thickness.

13 Claims, 21 Drawing Sheets

(56) References Cited

U.S. PATENT DOCUMENTS

| | | | |
|---|---|---|---|
| 7,175,505 B1 | 2/2007 | Ko et al. | |
| 2002/0013007 A1* | 1/2002 | Hasegawa | B24B 37/013 438/8 |
| 2002/0192966 A1* | 12/2002 | Shanmugasundram | B24B 37/013 438/692 |
| 2005/0057755 A1* | 3/2005 | Johnson | G01B 11/0625 438/7 |
| 2005/0281983 A1 | 12/2005 | Crkvenac et al. | |
| 2008/0206993 A1* | 8/2008 | Lee | B24B 37/013 438/692 |
| 2008/0268752 A1* | 10/2008 | Nemoto | B24B 7/228 451/8 |
| 2010/0015889 A1* | 1/2010 | Shimizu | B24B 37/013 451/5 |
| 2010/0075576 A1 | 3/2010 | Kobayashi et al. | |
| 2010/0124870 A1* | 5/2010 | Benvegnu | B24B 37/013 451/5 |
| 2011/0081829 A1* | 4/2011 | Ohta | B24B 37/013 451/6 |
| 2011/0104987 A1* | 5/2011 | David | B24B 37/013 451/5 |
| 2011/0256805 A1* | 10/2011 | David | B24B 37/013 451/5 |
| 2011/0275281 A1* | 11/2011 | David | B24B 37/013 451/5 |
| 2011/0318992 A1* | 12/2011 | David | B24B 37/013 451/5 |
| 2012/0021672 A1* | 1/2012 | David | B24B 37/013 451/6 |
| 2012/0026492 A1* | 2/2012 | Zhang | B24B 37/013 356/300 |
| 2013/0337586 A1* | 12/2013 | Iizumi | H01L 22/10 438/16 |
| 2014/0017824 A1* | 1/2014 | Iizumi | H01L 21/30625 438/16 |

FOREIGN PATENT DOCUMENTS

| | | |
|---|---|---|
| CN | 1713356 A | 12/2005 |
| CN | 101413780 A | 4/2009 |
| EP | 1336988 A1 | 8/2003 |
| EP | 1535699 A1 | 6/2005 |
| JP | 2003-042721 A | 2/2003 |
| JP | 2003-249472 A | 9/2003 |
| JP | 2004-012302 A | 1/2004 |
| JP | 2004-154928 | 6/2004 |
| JP | 2005-518654 A | 6/2005 |
| JP | 2005-340272 A | 12/2005 |
| JP | 2007-276035 A | 10/2007 |
| JP | 2009-522126 A | 6/2009 |
| JP | 2010-519771 A | 6/2010 |
| JP | 2010-186866 A | 8/2010 |
| JP | 2010-186886 A | 8/2010 |
| JP | 2010-240837 | 10/2010 |
| JP | 2011-000647 A | 1/2011 |
| JP | 4681059 B2 | 5/2011 |
| TW | 200733221 A | 9/2007 |
| TW | 201205703 A | 2/2012 |
| WO | WO 2008/103964 A2 | 8/2008 |

* cited by examiner

POLISHING APPARATUS AND POLISHED-STATE MONITORING METHOD

CROSS REFERENCE TO RELATED APPLICATIONS

This document claims priorities to Japanese Patent Application Number 2013-145734 filed Jul. 11, 2013 and Japanese Patent Application Number 2013-150507 filed Jul. 19, 2013, the entire contents of which are hereby incorporated by reference.

BACKGROUND

In a polishing apparatus for polishing a substrate, such as a semiconductor wafer, an in-situ spectral film-thickness monitor is used for the purpose of mainly monitoring a progress of polishing of a dielectric layer (transparent layer) and detecting a polishing end point. This in-situ spectral film-thickness monitor has a light source and a spectrophotometer mounted to a polishing table. The light source and the spectrophotometer are connected to a light-transmitting fiber and a light-receiving fiber, respectively. Distal ends of these fibers, which serve as a light-transmitting element and a light-receiving element, are arranged at positions as to scan a wafer surface once each time the polishing table rotates. The light-transmitting element and a light-receiving element are located so as to sweep across the center of the wafer, so that, each time the polishing table rotates, the light-transmitting element and the light-receiving element scan the wafer surface in a line (curved line) that is approximate to a diameter of the wafer surface.

In recent years, as semiconductor devices have been becoming smaller and finer, there is an increasing need for an improved polishing performance for a more-precise polishing result, and therefore there is a very stringent need for a precision of the in-situ spectral film-thickness monitor. However, since the in-situ spectral film-thickness monitor is not configured to obtain an absolute value of a film thickness, a measured value of the film thickness deviates slightly from a measured value of the film thickness obtained by an in-line (or a stand-alone) film-thickness measuring device that has been calibrated based on a film thickness of a reference wafer.

Moreover, it is not easy to calibrate the in-situ, spectral film-thickness monitor, because the in-situ spectral film-thickness monitor is installed in the polishing table. In other words, it is a time-consuming operation to calibrate the in-situ spectral film-thickness monitor that is installed in the polishing table, and there is a limit in a space for installing an automatic calibrating device. Further, components of the in-situ spectral film-thickness monitor themselves may be deteriorated with time. In addition, measurement points on the wafer surface and a distribution thereof are different from those of the in-line film-thickness measuring device. Under such circumstances, the measured values of the film thickness obtained by the in-situ spectral film-thickness monitor do not always agree with the measured values of the film thickness obtained by the in-line film-thickness measuring device. In addition, if a thickness of a layer that lies underneath a film to be polished varies from wafer to wafer, detection results of the polishing end point may also vary from wafer to wafer due to the influence of the variation in the thickness of the underlying layer.

Further, there may be a variation in the film thickness along a circumferential direction of the wafer. Such a variation in the film thickness along the circumferential direction of the wafer may adversely affect the measurement of the film thickness over the entire wafer.

In order to reduce the influence of the variation in the film thickness, there is a proposed method in which rotational speeds of a polishing table and a top ring are adjusted appropriately (see Japanese laid-open patent publication No. 2010-240837). According to this method, a film-thickness sensor scan a wafer surface in its entirety and can therefore obtain an average of the film thickness. However, in order to obtain the average of the film thickness, it is necessary to obtain film thickness data until the polishing table rotates multiple times. As a result, a time delay in monitoring of the film thickness may occur, and excessive polishing or insufficient polishing may occur due to a possible change in polishing rate.

SUMMARY OF THE INVENTION

Thus, it is an object to provide a polishing apparatus and a polished-state monitoring method capable of solving the above-discussed issues and capable of achieving a highly-precise polishing result.

Embodiments, which will be described below, relate to a polishing apparatus for polishing a substrate, such as a wafer, and a method of monitoring a polished-state of the substrate.

In an embodiment, there is provided a polishing apparatus, comprising: a polishing table for supporting a polishing pad; a top ring configured to press a substrate against the polishing pad; an in-line film-thickness measuring device configured to measure a film thickness of the substrate when the substrate is in a stationary state; and an in-situ spectral film-thickness monitor having a film thickness sensor disposed in the polishing table, the in-situ spectral film-thickness monitor being configured to subtract an initial film, thickness, measured by the in-situ spectral film-thickness monitor before polishing of the substrate, from an initial film thickness, measured by the in-line film-thickness measuring device before polishing of the substrate, to determine a correction value, add the correction value to a film thickness that is measured when the substrate is being polished to obtain a monitoring film thickness, and monitor a progress of polishing of the substrate based on the monitoring film thickness.

In an embodiment, there is provided a polished-state monitoring method, comprising: measuring an initial film thickness of a substrate by an in-line film-thickness measuring device when the substrate is in a stationary state; measuring an initial film thickness of the substrate by an in-situ spectral film-thickness monitor when the substrate is on a polishing pad supported by a polishing table; subtracting the initial film thickness, measured by the in-situ spectral film-thickness monitor, from the initial film thickness, measured by the in-line film-thickness measuring device, to determine a correction value; polishing the substrate by pressing the substrate against the polishing pad while supplying a polishing liquid onto the polishing pad; adding the correction value to a film thickness that is measured by the in-situ spectral film-thickness monitor when the substrate is being polished to obtain a monitoring film thickness; and monitoring a progress of polishing of the substrate based on the monitoring film thickness.

In an embodiment, there is provided a polishing apparatus, comprising: a polishing table for supporting a polishing pad; a top ring configured to press a substrate against the polishing pad; and an in-situ spectral film-thickness monitor having a film thickness sensor disposed in the polishing table, the in-situ spectral film-thickness monitor being configured to irradiate the substrate with light, produce spectra of reflected light from the substrate, determine a rotational angle of the substrate using the spectra, and determine a film thickness from the spectra.

In an embodiment, there is provided a polished-state monitoring method, comprising: pressing a substrate against a polishing pad; irradiating the substrate on the polishing pad with light; producing spectra of reflected light from the substrate; determining a rotational angle of the substrate using the spectra; determining a film thickness from the spectra; and monitoring a progress of polishing of the substrate based on the film thickness.

According to the above-described embodiments, a measured value obtained by the in-situ spectral film-thickness monitor is corrected by the correction value. As a result, an accurate polished state can be monitored, and a highly-precise polishing result can be achieved.

According to the above-described embodiments, an average of the monitoring film thickness can be obtained without depending on the variation in the film thickness along the circumferential direction of the wafer surface, with no time delay. Further, the monitoring film thickness can be obtained at locations that completely correspond to film-thickness management points before and after polishing.

DETAILED DESCRIPTION OF EMBODIMENTS

Figure 1:
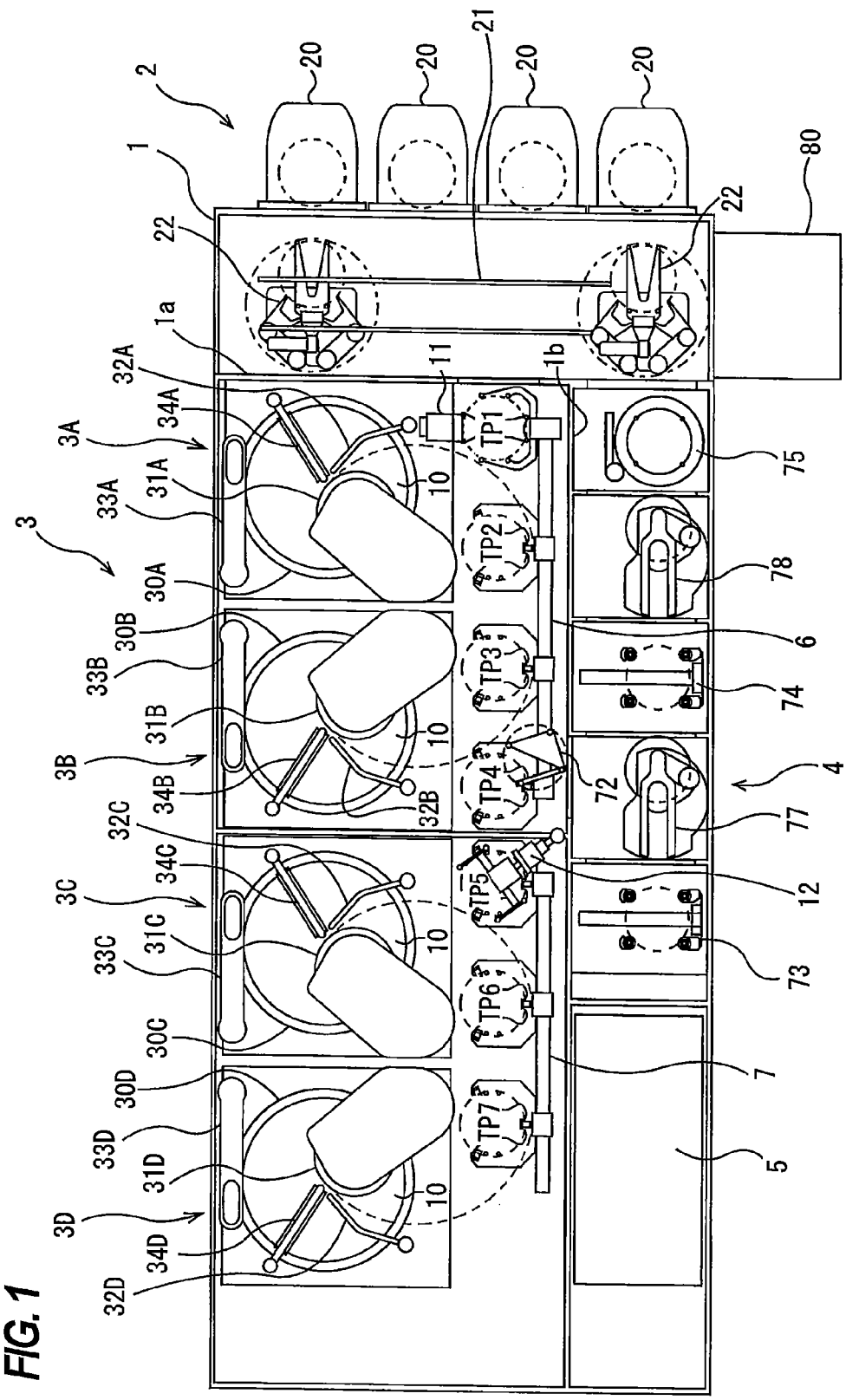
FIG. 1 is a view showing a polishing apparatus according to an embodiment.

Embodiments will be described with reference to the drawings. FIG. 1 is a view showing a polishing apparatus according to an embodiment. As shown in FIG. 1, the polishing apparatus has a housing 1 in approximately a rectangular shape. An interior space of the housing 1 is divided by partitions 1*a*, 1*b* into a load-unload section 2, a polishing section 3, and a cleaning section 4. The polishing apparatus includes an operation controller 5 configured to control wafer processing operations.

The load-unload section 2 has front load sections 20 on which wafer cassettes are placed, respectively. A plurality of wafers (or substrates) are stored in each wafer cassette. The load-unload section 2 has a moving mechanism 21 extending along an arrangement direction of the front load sections 20. Two transfer robots (loaders) 22 are provided on the moving mechanism 21, so that the transfer robots 22 can move along the arrangement direction of the front load sections 20. Each transfer robot 22 is able to access the wafer cassettes mounted to the front load sections 20.

The polishing section 3 is an area where a wafer is polished. This polishing section 3 includes a first polishing unit 3A, a second polishing unit 3B, a third polishing unit 3C, and a fourth polishing unit 3D. As shown in FIG. 1, the first polishing unit 3A includes a first polishing table 30A supporting a polishing pad 10 having a polishing surface, a first top ring 31A for holding a wafer and pressing the wafer against the polishing pad 10 on the polishing table 30A so as to polish the wafer, a first polishing liquid supply mechanism 32A for supplying a polishing liquid (e.g., slurry) and a dressing liquid (e.g., pure water) onto the polishing pad 10, a first dresser 33A for dressing the polishing surface of the polishing pad 10, and a first atomizer 34A for ejecting a liquid (e.g., pure water) or a mixture of a liquid (e.g., pure water) and a gas (e.g., nitrogen gas) in an atomized state onto the polishing surface of the polishing pad 10.

Similarly, the second polishing unit 33 includes a second polishing table 3013 supporting a polishing pad 10, a second top ring 3113, a second polishing liquid supply mechanism 3211, a second dresser 3311, and a second atomizer 34B. The third polishing unit 3C includes a third polishing table 30C supporting a polishing pad 10, a third top ring 31C, a third polishing liquid supply mechanism 32C, a third dresser 33C, and a third atomizer 34C. The fourth polishing unit 3D includes a fourth polishing table 30D supporting a polishing pad 10, a fourth top ring 31D, a fourth polishing liquid supply mechanism 32D, a fourth dresser 33D, and a fourth atomizer 34D.

Figure 2:
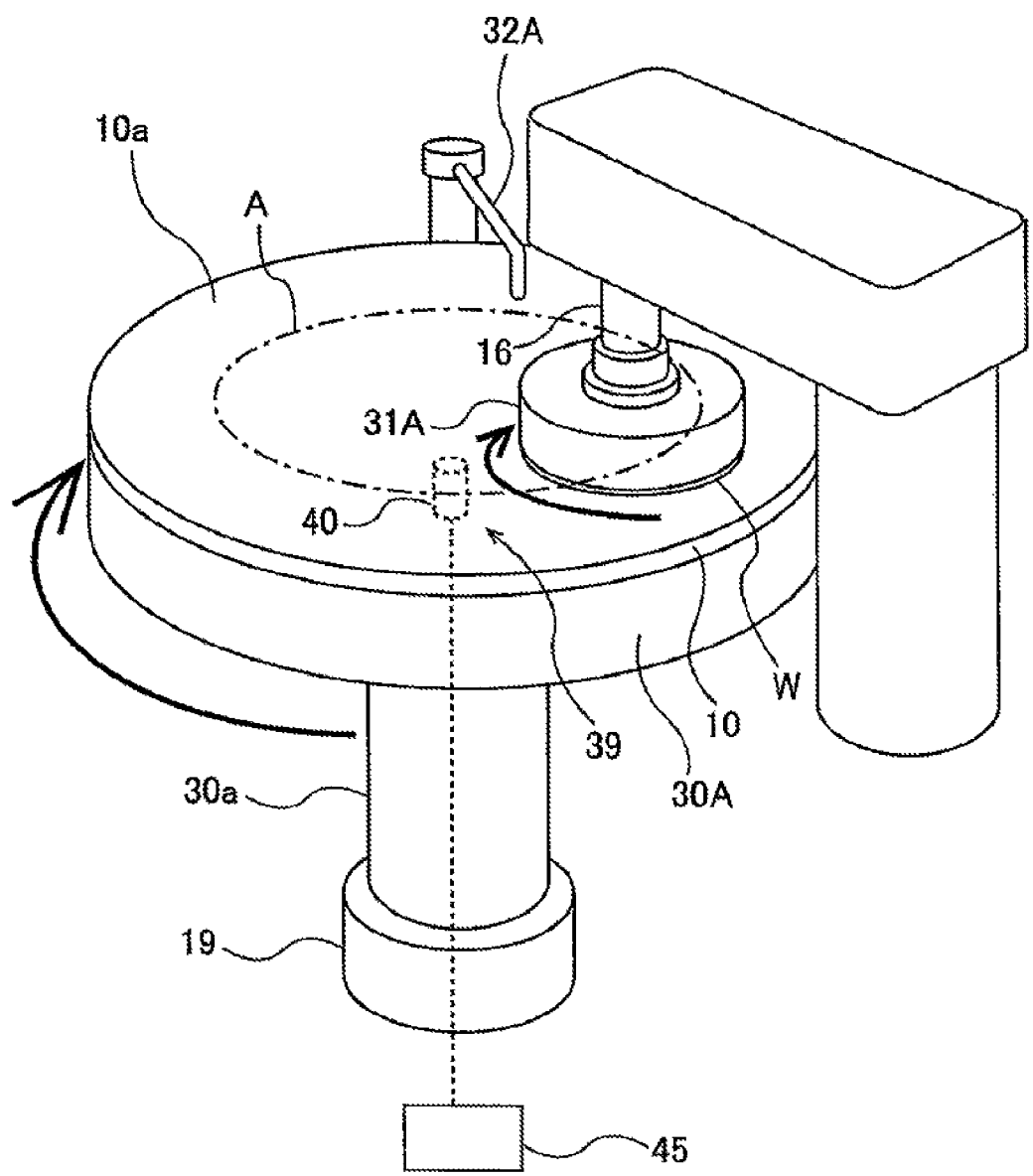
FIG. 2 is a perspective view schematically showing a first polishing unit.

The first polishing unit 3A, the second polishing unit 313, the third polishing unit 3C, and the fourth polishing unit 3D have the same configuration. Therefore, the first polishing unit 31A will be described below with reference to FIG. 2, FIG. 2 is a perspective view schematically showing the first polishing unit 31A. In FIG. 2, the dresser 33A and the atomizer 34A are omitted.

The polishing table 30A is coupled to a table motor 19 through a table shall 30a, so that the polishing table 30A is rotated by the table motor 19 in a direction indicated by arrow. The table motor 19 is provided below the polishing table 30A. The polishing pad 10 is attached to an upper surface of the polishing table 30A. The polishing pad 10 has an upper surface 10a, which provides a polishing surface for polishing the wafer W. The top ring 31A is secured to a lower end of the top ring shaft 16. The top ring 31A is configured to hold the wafer W on its lower surface by vacuum suction. The top ring shaft 16 is elevated and lowered by an elevating mechanism (not shown in the drawing).

The first polishing unit 31A includes an in-situ spectral film-thickness monitor 39 for monitoring a film thickness of the wafer W. This in-situ spectral film-thickness monitor 39 has a film thickness sensor 40 for obtaining a film, thickness signal that varies in accordance with the film thickness of the wafer W, and a processor 45 for determining the film thickness from the film thickness signal. The film thickness sensor 40 is disposed in the polishing table 30A. The film thickness sensor 40 rotates together with the polishing table 30A as indicated by arrow A and obtains the film thickness signal of the wafer W held on the top ring 31A. The film thickness sensor 40 is coupled to the processor 45 so that the film thickness signal, obtained by the film thickness sensor 40, is sent to the processor 45.

Figure 3:
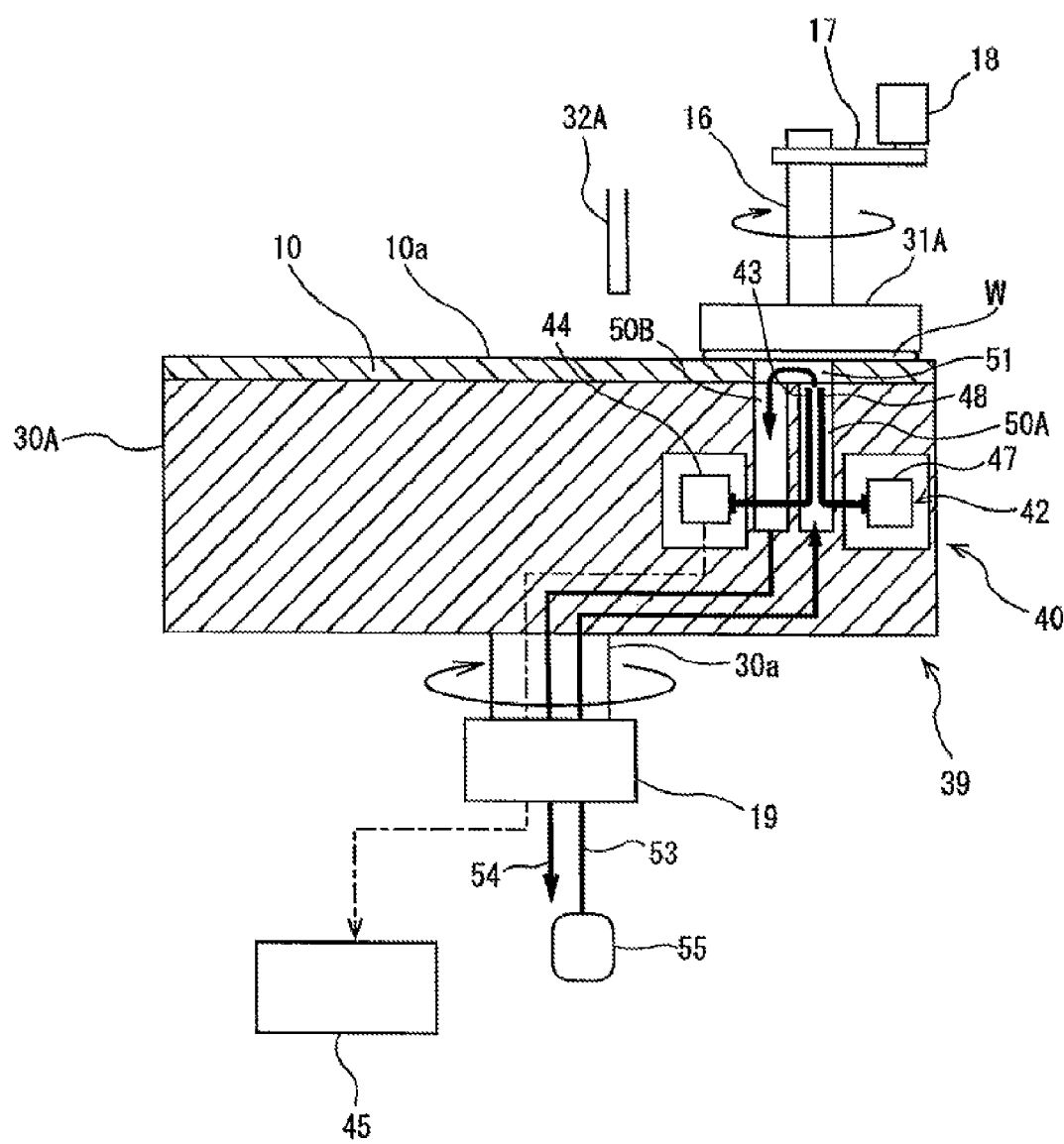
FIG. 3 is a schematic cross-sectional view showing the first polishing unit having an in-situ spectral film-thickness monitor.

Next, the in-situ spectral film-thickness monitor 39 will be described. FIG. 3 is a schematic cross-sectional view showing the first polishing unit 3A having the in-situ spectral film-thickness monitor 39. The polishing units 3B to 3D have the same structure as that of the first polishing unit 3A shown in FIG. 3 and their repetitive descriptions are omitted.

The top ring shaft 16 is coupled to a top ring motor 18 through a coupling device 17, such as belt, so that the top ring shaft 16 is rotated by the top ring motor 18. This rotation of the top ring shaft 16 is transmitted to the top ring 31A to rotate it in the direction indicated by arrow.

As described previously, the in-situ spectral film-thickness monitor 39 includes the film thickness sensor 40 and the processor 45. The film thickness sensor 40 is configured to irradiate the surface of the wafer W with light, receive the light reflected from the wafer W, and break up the reflected light according to wavelength. The film thickness sensor 40 includes an optical transmitter 42 for irradiating the surface, to be polished, of the wafer W with the light, an optical fiber 43 as an optical receiver for receiving the reflected light from the wafer W, a spectrophotometer (or spectrometer) 44 configured to resolve the reflected light according to the wavelength and measure intensity of the reflected light over a predetermined wavelength range.

The polishing table 30A has a first hole 50A and a second hole 50B having upper open ends lying in the upper surface of the polishing table 30A. The polishing pad 10 has a through-hole 51 at a position corresponding to the holes 50A and 50B. The holes 50A and 50B are in fluid communication with the through-hole 51, which has an upper open end lying in the polishing surface 10a. The first hole 50A is coupled to a liquid supply source 55 via a liquid supply passage 53 and a rotary joint (not shown). The second hole 50B is coupled to a liquid discharge passage 54.

The optical transmitter 42 includes a light source 47 for emitting multiwavelength light and an optical fiber 48 coupled to the light source 47. The optical fiber 48 is an optical transmission element for transmitting the light, emitted by the light source 47, to the surface of the wafer W. The distal ends of the optical fiber 48 and the optical fiber 43 lie in the first hole 50A and are located near the surface, to be polished, of the wafer W. The distal ends of the optical fiber 48 and the optical fiber 43 are arranged so as to face the wafer W held by the top ring 31A, so that multiple zones of the wafer W are irradiated with the light each time the polishing table 30A makes one revolution. Preferably, the distal ends of the optical fiber 48 and the optical fiber 43 are arranged so as to face the center of the wafer W held by the top ring 31A.

During polishing of the wafer W, the liquid supply source 55 supplies water (preferably pure water) as a transparent liquid into the first hole 50A through the liquid supply passage 53. The water fills a space formed between the lower surface of the wafer W and the distal ends of the optical fibers 48, 43. The water further flows into the second hole 50B and is expelled therefrom through the liquid discharge passage 54. The polishing liquid is discharged together with the water and thus a path of light is secured. The liquid supply passage 53 is provided with a valve (not shown in the drawing) configured to operate in conjunction with the rotation of the polishing table 30A. The valve operates so as to stop the flow of the water or reduce the flow of the water when the wafer W is not located over the through-hole 51.

The optical fiber 48 and the optical fiber 43 are arranged in parallel with each other. The distal ends of the optical fiber 48 and the optical fiber 43 are perpendicular to the surface of the wafer W, so that the optical fiber 48 transmits the light to the surface of the wafer W perpendicularly.

During polishing of the wafer W, the optical transmitter 42 irradiates the wafer W with the light, and the optical fiber (optical receiver) 43 receives the light reflected from the wafer W. The spectrophotometer 44 measures the intensity of the reflected light at each of the wavelengths over the predetermined wavelength range and sends light intensity data to the processor 45. This light intensity data is the film thickness signal reflecting the film thickness of the wafer W, and varies in accordance with the film thickness of the wafer W. The processor 45 produces a spectrum showing the light intensities at the respective wavelengths from the light intensity data, and further determines the film thickness of the wafer W from the spectrum.

Figure 4:
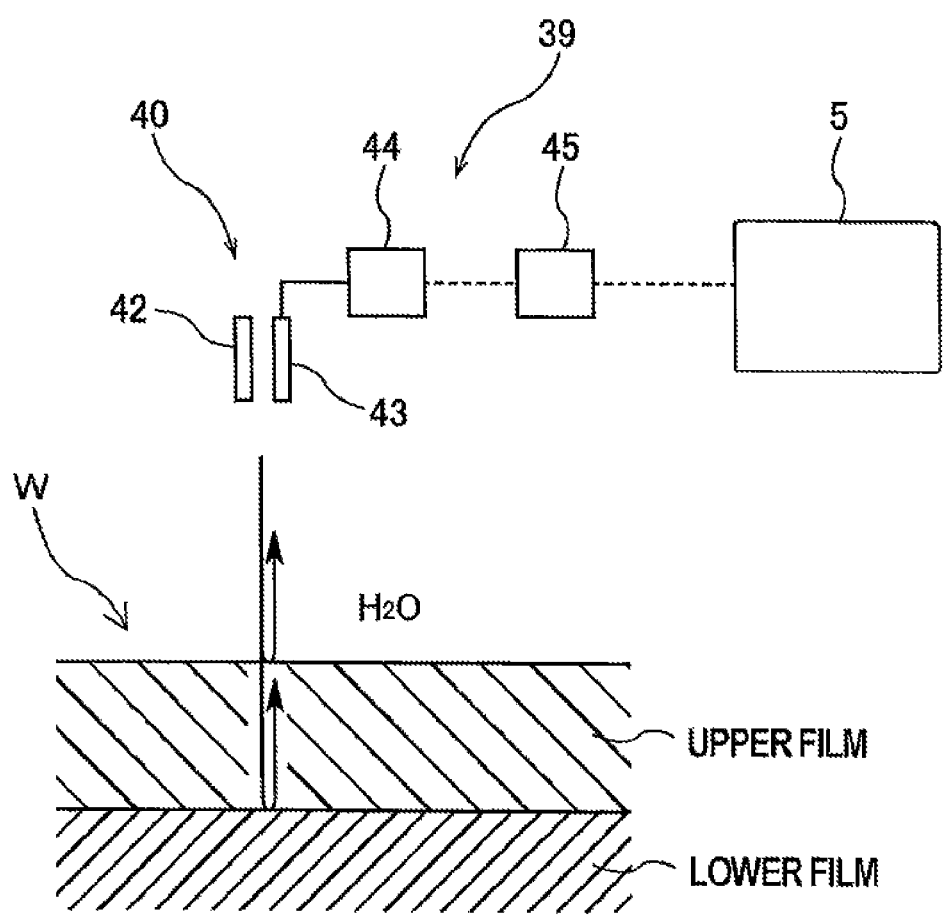
FIG. 4 is a schematic view illustrating the principle of the in-situ spectral film-thickness monitor.
Figure 5:
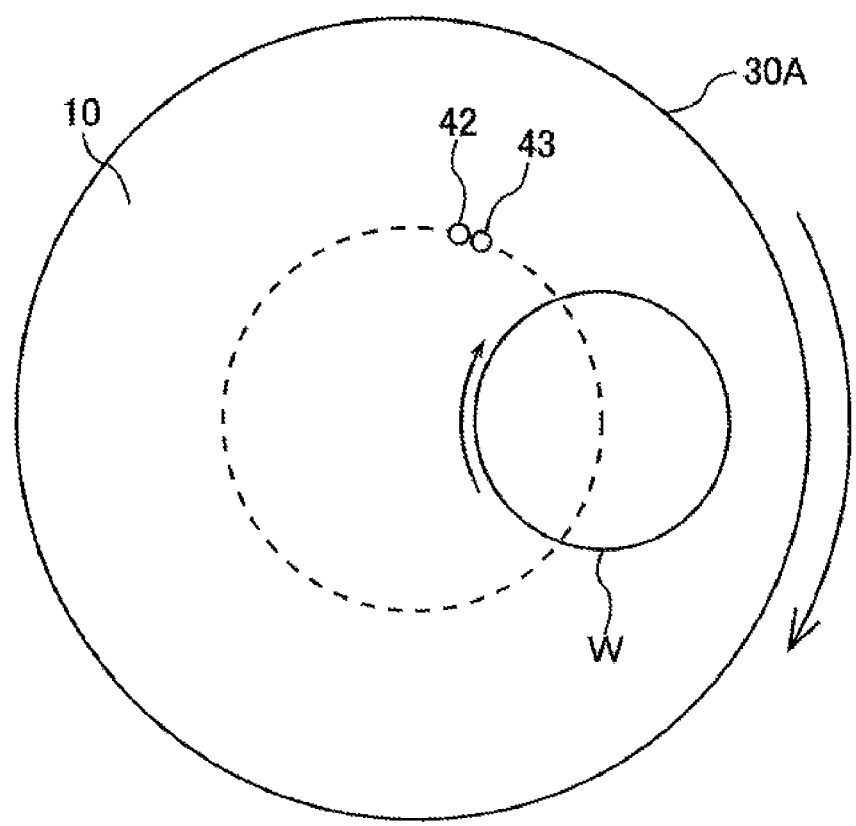
FIG. 5 is a plan view showing a positional relationship between a wafer and a polishing table.

FIG. 4 is a schematic view illustrating the principle of the in-situ spectral film-thickness monitor 39, and FIG. 5 is a plan view showing a positional relationship between the wafer W and the polishing table 30A. In this example shown in FIG. 4, the wafer W has a lower film and an upper film formed on the lower film. The optical transmitter 42 and the optical receiver 43 are oriented toward the surface of the wafer W. The optical transmitter 42 is configured to transmit the light to the multiple zones, including the center of the wafer W, on the surface of the wafer W each time the polishing table 30A makes one revolution.

The light, transmitted to the wafer W, is reflected off an interface between a medium (e.g., water in the example of FIG. 4) and the upper film and an interface between the upper film and the lower film. Light waves from these interfaces interfere with each other. The manner of interference between the light waves varies according to the thickness of the upper film (i.e., a length of an optical path). As a result, the spectrum, produced from the reflected light from the wafer, varies according to the thickness of the upper film. The spectrophotometer 44 breaks up the reflected light according to the wavelength and measures the intensity of the reflected light at each of the wavelengths. The processor 45 produces the spectrum from the light intensity data (the film thickness signal) obtained from the spectrophotometer 44. This spectrum is expressed as a line graph (i.e., a spectral waveform) indicating a relationship between the wavelength and the intensity of the light. The intensity of the light can also be expressed as a relative value, such as a reflectance or a relative reflectance.

Figure 6:
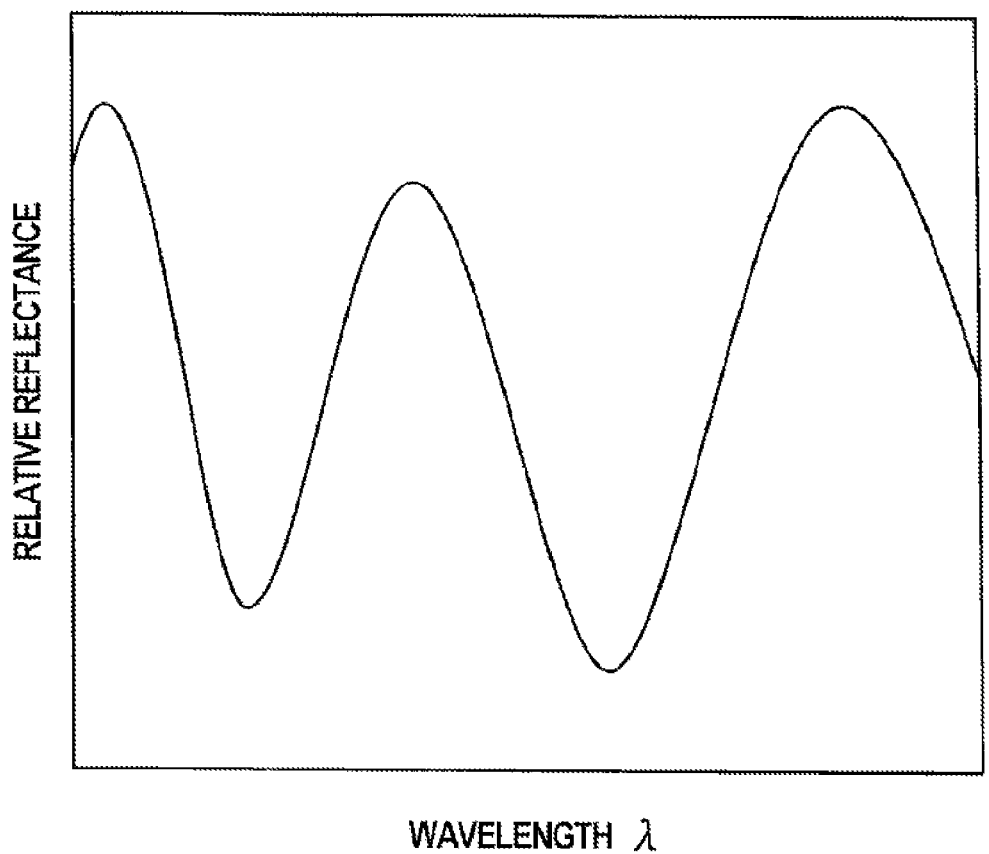
FIG. 6 is a diagram showing a spectrum created by a processor.

FIG. 6 is a diagram showing the spectrum created by the processor 45. In FIG. 6, horizontal axis represents the wavelength of the reflected light, and vertical axis represents relative reflectance derived from the intensity of the light. The relative reflectance is an index that represents the intensity of the reflected light. More specifically, the relative reflectance is a ratio of the intensity of the reflected light to a predetermined reference intensity. This reference intensity is obtained in advance at each of the wavelengths. By dividing the intensity of the light (i.e., the actually measured intensity) by the corresponding reference intensity at each of the wavelengths, unwanted noise, such as a variation in the intensity inherent in an optical system or the light source, are removed from the actually measured intensity. As a result, the spectrum reflecting only the film thickness information of the wafer W can be obtained.

The predetermined reference intensity may be an intensity of the reflected light obtained when a silicon wafer (bare wafer) with no film thereon is being polished in the presence of water. In the actual polishing process, the relative reflectance is obtained as follows. A dark level (which is a background intensity obtained under the condition that the light is cut off) is subtracted from the actually measured intensity to determine a corrected actually measured intensity. Further, the dark level is subtracted from the reference intensity to determine a corrected reference intensity. Then the relative reflectance is calculated by dividing the corrected actually measured intensity by the corrected reference intensity. That is the relative reflectance $R(\lambda)$ can be calculated by using the following equation (1)

$$R(\lambda) = \frac{E(\lambda) - D(\lambda)}{B(\lambda) - D(\lambda)} \quad (1)$$

where $\lambda$ is wavelength, $E(\lambda)$ is the intensity of the reflected light at the wavelength $\lambda$, $B(\lambda)$ is the reference intensity at the wavelength $\lambda$, and $D(\lambda)$ is the dark level at the wavelength $\lambda$ (i.e., the intensity of the light obtained under the condition that the light is cut off).

Figure 7:
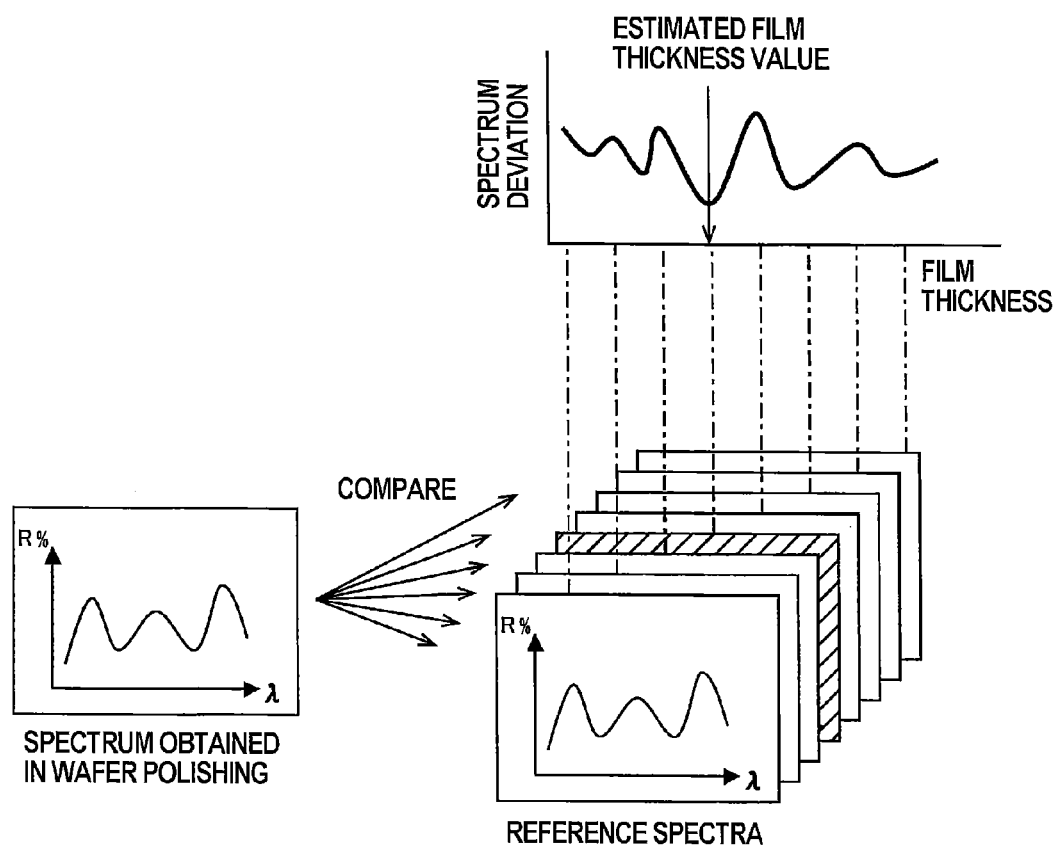
FIG. 7 is a diagram illustrating a process of determining a current film thickness from comparison between a spectrum obtained and a plurality of reference spectra.

FIG. 7 is a diagram illustrating a process of determining the current film thickness from comparison between a spectrum obtained and a plurality of reference spectra. The processor 45 compares the spectrum, which is produced when the wafer is being polished, with a plurality of reference spectra so as to determine a reference spectrum that is most similar to the spectrum produced. A film thickness associated with the determined reference spectrum is determined to be a current film thickness by the processor 45. The plurality of reference spectra are those obtained in advance by polishing a wafer of the same type as the wafer to be polished. Each reference spectrum is associated with a film thickness at a point of time when that reference spectrum is obtained. Specifically, each reference spectrum is obtained at different film thickness, and the plurality of reference spectra correspond to different film thicknesses. Therefore, the current film thickness can be estimated by determining the reference spectrum that is most similar to the current spectrum.

Polishing of the wafer W is performed as follows. The top ring 31A and the polishing table 30A are rotated in the respective directions indicated by the arrows, while the polishing liquid (slurry) is supplied from the polishing liquid supply mechanism 32A onto the polishing pad 10. In this state, the top ring 31A, holding the wafer W on its lower surface, presses the wafer W against the polishing surface 10a of the polishing pad 10. The surface of the wafer W is polished by a mechanical action of abrasive grains contained in the polishing liquid and a chemical action of the polishing liquid. After polishing of the wafer, dressing (or conditioning) of the polishing surface 10a is performed by the dresser 33A, and then the high-pressure fluid is supplied from the atomizer 34A onto the polishing surface 10a, thereby removing polishing debris and the abrasive grains remaining on the polishing surface 10a.

Referring back to FIG. 1, a first linear transporter 6 is disposed adjacent to the first polishing unit 3A and the second polishing unit 3B. This first linear transporter 6 is configured to transport the wafer between four transfer positions (i.e., a first transfer position TP1, a second transfer position TP2, a third transfer position TP3, and a fourth transfer position TP4). A second linear transporter 7 is arranged adjacent to the third polishing unit 3C and the fourth polishing unit 3D. This second linear transporter 7 is configured to transport the wafer between three transfer positions (i.e., a fifth transfer position TP5, a sixth transfer position TP6, and a seventh transfer position TP7).

The wafer is transported to the polishing unit, 3A, 3B by the first linear transporter 6. The top ring 31A of the first polishing unit 3A is moved between a position above the polishing table 30A and the second transfer position TP2 by the swinging motion of the top ring 31A. Therefore, the wafer is transferred to and from the top ring 31A at the second transfer position TP2. Similarly, the top ring 31B of the second polishing unit 3B is moved between a position above the polishing table 30B and the third transfer position TP3, and the wafer is transferred to and from the top ring 31B at the third transfer position TP3. The top ring 31C of the third polishing unit 3C is moved between a position above the polishing table 30C and the sixth transfer position TP6, and the wafer is transferred to and from the top ring 31C at the sixth transfer position TP6. The top ring 31D of the fourth polishing unit 3D is moved between a position above the polishing table 30D and the seventh transfer position TP7, and the wafer is transferred to and from the top ring 31D at the seventh transfer position TP7.

A lifter 11 for receiving the wafer from the transfer robot 22 is provided adjacent to the first transfer position TP1. The wafer is transported from the transfer robot 22 to the first linear transporter 6 via the lifter 11. A shutter (not shown in the drawing) is provided on the partition 1a at a position between the lifter 11 and the transfer robot 22. When the wafer is to be transported, this shutter is opened to allow the transfer robot 22 to deliver the wafer to the lifter 11.

A swing transporter 12 is provided between the first linear transporter 6, the second linear transporter 7, and the cleaning section 4. Transporting of the wafer from the first linear transporter 6 to the second linear transporter 7 is performed by the swing transporter 12. The wafer is transported to the third polishing unit 3C and/or the fourth polishing unit 3D by the second linear transporter 7.

An in-line film-thickness measuring device 80 is provided adjacent to the transfer robots 22. The wafer is transported to the in-line film-thickness measuring device 80 by the transfer robot 22 before and/or after polishing so that the film thickness of the wafer is measured by the in-line film-thickness measuring device 80.

Figure 8:
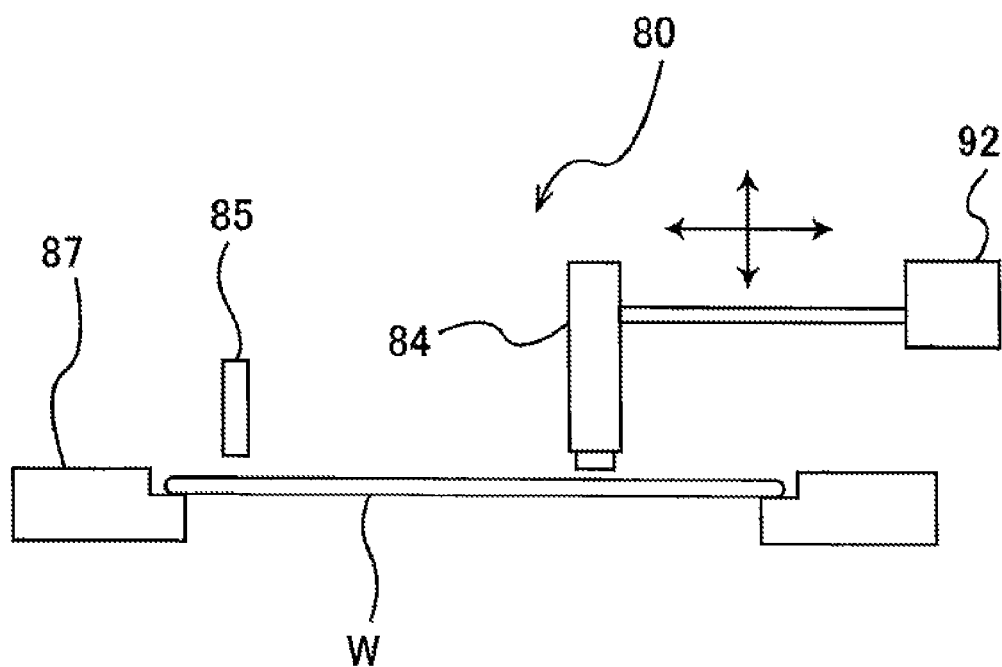
FIG. 8 is a schematic view showing an in-line film-thickness measuring device.

Next, the in-line film-thickness measuring device 80 will be described with reference to FIG. 8, which shows a schematic view of the in-line film-thickness measuring device 80. Hereinafter, the in-line film-thickness measuring device 80 will be explained. FIG. 8 is a schematic view of the in-line film-thickness measuring device 80. The in-line film-thickness measuring device 80 has a substrate stage 87 on which the wafer W is placed horizontally, and a film-thickness measuring head 84 for measuring the film thickness of the wafer W.

The substrate stage 87 includes an annular member extending along the peripheral portion of the wafer W or a plurality of supporting members arranged along the peripheral portion of the wafer W for supporting the peripheral portion of the water W. With a film, to be measured, facing upward, the wafer W is placed onto the substrate stage 87 by the above-described transfer robot 22.

An orientation detector 85 for detecting an orientation of the wafer W with respect to the circumferential direction of the wafer W is provided above the wafer W supported on the substrate stage 87. This orientation detector 85 is configured to detect a cut-out portion, such as a notch or an orientation flat, formed in the peripheral portion of the wafer W to thereby detect the orientation of the wafer W. The substrate stage 87 has a substrate rotating device (not shown) for rotating the wafer W about its axis so that the substrate stage 87 can freely adjust the orientation (or a position with respect to the circumferential direction) of the wafer W detected by the orientation detector 85. The orientation of the wafer W is detected by the orientation detector 85 while the substrate stage 87 is rotating the wafer W, and the wafer W is further rotated by the substrate stage 87 until the wafer W is oriented in a predetermined direction.

During measuring of the film thickness, the wafer W remains stationary on the substrate stage 87 with the orientation of the wafer W aligned with the predetermined direction. When the peripheral portion of the wafer W is placed on the substrate stage 87, the wafer W becomes in a horizontal position. The film-thickness measuring head 84 is disposed above the wafer W on the substrate stage 87. The film-thickness measuring head 84 is configured to transmit light perpendicularly to the surface of the wafer W, receive the reflected light from the wafer W, produce a spectrum of the reflected light, and determine the film thickness of the wafer W based on the spectrum.

The film-thickness measuring head 84 is coupled to a head-moving mechanism 92, which is capable of moving the film-thickness measuring head 84 freely in a horizontal plane that is parallel with the surface of the wafer W. The head-moving mechanism 92 is further capable of moving the film-thickness measuring head 84 in the vertical direction. With this head-moving mechanism 92, the film-thickness measuring head 84 can measure the film thickness at multiple measurement points on the wafer W. During measuring of the film thickness, the wafer W remains stationary and lies horizontally. Therefore, the film-thickness measuring head 84 can measure the film thickness more accurately than the in-situ spectral film-thickness monitor 39 that measures the film thickness of the rotating wafer.

Figure 9:
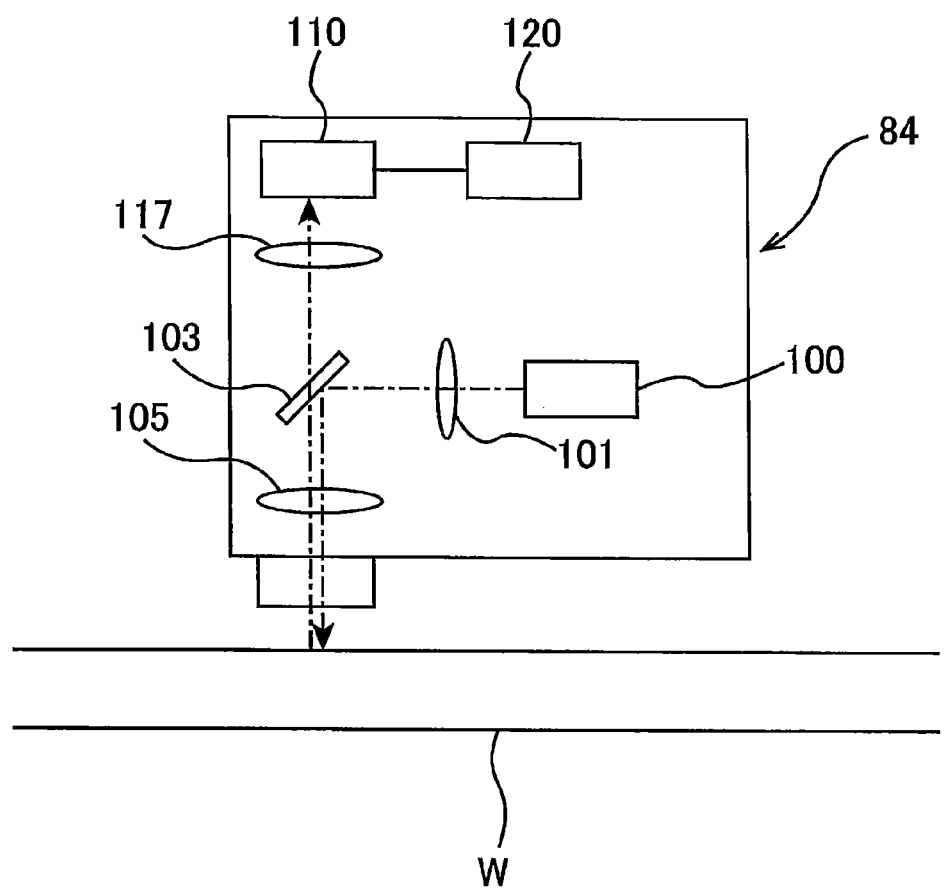
FIG. 9 is a schematic view showing a detailed structure of a film-thickness measuring head of the in-line film-thickness measuring device.

FIG. 9 is a schematic view showing a detailed structure of the film-thickness measuring head 84 of the in-line film-thickness measuring device 80. As shown in FIG. 9, the film-thickness measuring head 84 has a light source 100 for emitting multiwavelength light, a condensing lens 101 for condensing the light emitted from the light source 100, a beam splitter 103 for directing the light that has passed through the condensing lens 101 to the wafer W, an imaging lens 105 for focusing the light from the beam splitter 103 on the wafer W, and a spectrophotometer 110 for measuring the intensity of the reflected light from the wafer W. A relay lens 117 is disposed between the spectrophotometer 110 and the beam splitter 103.

The spectrophotometer 110 is configured to resolve the reflected light according to the wavelength and measure the intensity of the reflected light at each of the wavelengths over a predetermined wavelength range. The film-thickness measuring head 84 further includes a processor 120 for producing the spectrum from light intensity data (film thickness signal) obtained from the spectrophotometer 110 and determining the film thickness based on the spectrum. The spectrum indicates the intensity of the light at each of the wavelengths. The measured value of the film thickness, obtained by the in-line film-thickness measuring device 80, is sent to the processor 45 of the in-situ spectral film-thickness monitor 39.

Referring back to FIG. 1, a temporary stage 72 for the wafer W is disposed beside the swing transporter 12. This temporary stage 72 is mounted to a non-illustrated frame. As shown in FIG. 1, the temporary stage 72 is arranged adjacent to the first linear transporter 6 and located between the first linear transporter 6 and the cleaning section 4. The swing transporter 12 is configured to move between the fourth transfer position TP4, the fifth transfer position TP5, and the temporary stage 72. In this embodiment, when the wafer is transported between the polishing units 3A to 3D, the wafer is released from the top ring and is delivered to other polishing unit through the linear transporters 6, 7. It is noted that a device for transporting the wafer between the polishing units is not limited to this embodiment. For example, the top ring may move to other polishing unit while holding the wafer thereon to thereby transport the wafer directly.

The wafer W, placed on the temporary stage 72, is transported to the cleaning section 4 by a first transfer robot 77 of the cleaning section 4. As shown in FIG. 1, the cleaning section 4 includes a first cleaning device 73 and a second cleaning device 74 for cleaning the polished wafer with a cleaning liquid, and a drying device 75 for drying the cleaned wafer. The first transfer robot 77 is configured to transport the wafer from the temporary stage 72 to the first cleaning device 73 and further transport the wafer from the first cleaning device 73 to the second cleaning device 74. A second transfer robot 78 is arranged between the second cleaning device 74 and the drying device 75. This second transfer robot 78 is operable to transport the wafer from the second cleaning device 74 to the drying device 75.

The dried wafer is removed from the drying device 75 by the transfer robot 22 and returned to the wafer cassette. In this manner, a sequence of processes including polishing, cleaning, drying, and film-thickness measuring is performed on the wafer.

Figure 10:
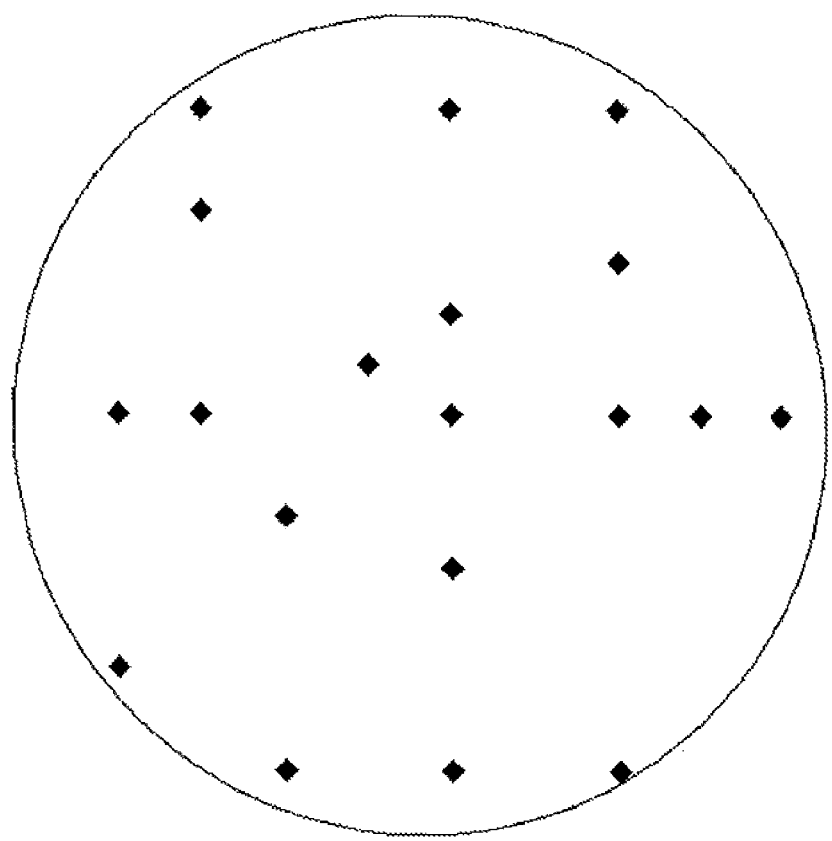
FIG. 10 is a diagram showing an example of measurement points at which the in-line film-thickness measuring device measures the film thickness before and after polishing.

FIG. 10 is a diagram showing an example of the measurement points at which the in-line film-thickness measuring device 80 measures the film thickness before and after polishing of the wafer. Basically, the measurement points are distributed over the wafer surface in its entirety so that an average or a representative value of the film thickness can be obtained with a limited number of measurement points.

Figure 11:
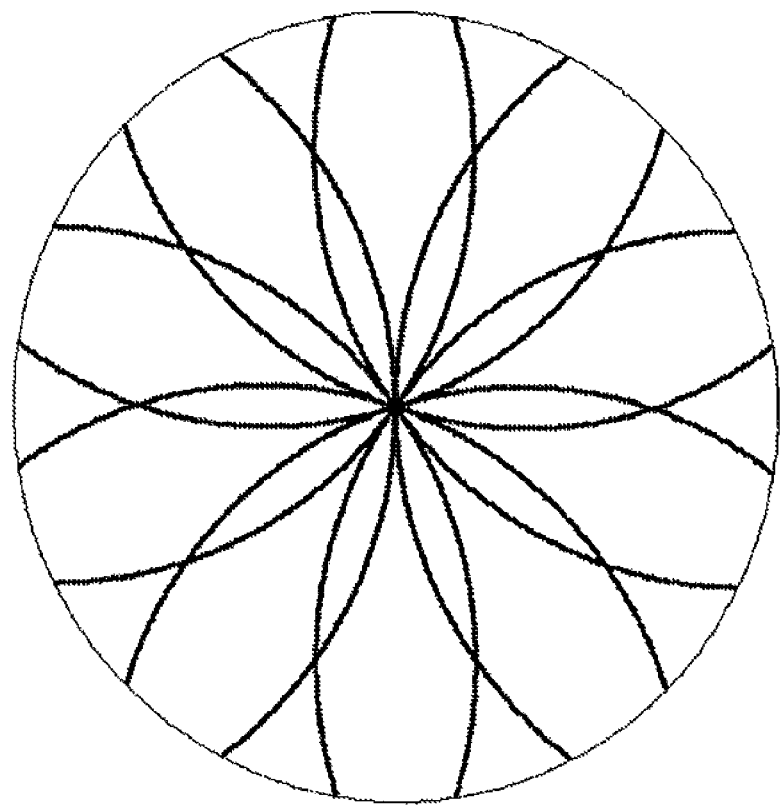
FIG. 11 is a diagram showing an example of paths of a film thickness sensor of the in-situ spectral film-thickness monitor when scanning a wafer surface.

FIG. 11 is a diagram showing an example of scanning paths on the wafer surface described by the film thickness sensor 40 of the in-situ spectral film-thickness monitor 39. In this example, the polishing table 30A rotates at a rotational speed or 60 min$^{-1}$ while the top ring 31A rotates at a rotational speed of 66 min$^{-1}$. In this case, the film thickness sensor 40 scans the wafer surface evenly with respect to the circumferential direction while the polishing table 30A makes ten revolutions until the film thickness sensor 40 is returned to its original position. Therefore, during this table rotation, the film thickness sensor 40 measures the wafer surface in its entirety. While the polishing table 30A makes five revolutions, the film thickness sensor 40 scans the wafer surface half around the wafer with respect to the circumferential direction. Therefore, in view of measurement points upstream and downstream of the wafer center, it can be said that the film thickness sensor 40 can approximately measure the wafer surface in its entirely while the polishing table 30A makes five revolutions. Therefore, by averaging the film thickness values that have been obtained while the polishing table 30A makes ten revolutions or five revolutions, it is possible to obtain an average value of the film thickness values that does not depend on the film thickness distribution in the circumferential direction of the wafer surface.

However, as can be seen from FIG. 11, the majority of the measurement points exist in a central zone of the wafer. As a result, if the film is thick in this central zone, the average of the film thickness values becomes larger than an actual film thickness, and if the film is thin in the central zone, the average of the film thickness values becomes smaller than the actual film thickness.

Thus, before polishing of the wafer, the in-line film-thickness measuring device 80 obtains the spectra at the multiple measurement points as shown in FIG. 10, determines the film thicknesses at the measurement points, respectively, and obtains a film thickness TL0 which is an average of these film thicknesses, if the measurement point is a measurement zone (which may be referred to as a measurement pad) that is formed on a scribe line, a film thickness of each layer can be determined by calculating the reference spectrum theoretically and comparing the reference spectrum with the measured spectrum according to a curve fitting method.

With respect to the measurement points during polishing as shown in FIG. 11, a film thickness TS0 that represents a film thickness before polishing is determined as follows. The film thicknesses are determined from the spectra that have been obtained during initial polishing of the wafer (e.g., while the polishing table 30A makes five revolutions or ten revolutions), and the film thickness TS0 before polishing is calculated based on a polishing rate and a polishing time. In this case, the film thickness TS0 may be determined by calculating an average spectrum of the spectra obtained at the multiple measurement points during the initial polishing, determining a film thickness from the average spectrum, and converting the determined film thickness into the film thickness TS0 based on the polishing rate and an average of measurement times (i.e., polishing times) at the respective measurement points. Alternatively, the film thickness TS0 may be determined by determining multiple film thicknesses from the corresponding spectra obtained at the respective measurement points, converting the multiple film thicknesses into estimated film thicknesses, representing those before polishing, based on the polishing rate and the measurement times (i.e., polishing times), and calculating the film thickness TS0 that is an average of the estimated film thicknesses. Alternatively, it is possible to provide a water-polishing step for a short period of time before polishing of the wafer with use of the slurry, and determine the film thickness TS0, representing the thickness before polishing, while performing the water-polishing step in which polishing of the wafer does not progress and the film thickness does not change in any portion of the wafer surface. This water-polishing step is a process of polishing the wafer while supplying pure water, instead of the slurry, onto the polishing pad. During this water polishing, polishing of the water does not substantially progress.

In the in-situ film-thickness monitoring, each measurement point (or measurement zone) exists at various locations on patterns. Therefore, it is difficult to determine the film thickness by the comparison between the measurement spectrum and the reference spectrum that has been determined from the theoretic calculation. Thus, as shown in FIG. 7, the measurement spectrum may be compared with the reference spectra that have been obtained by polishing a wafer having the same specification (the same masks, and the same layers). Specifically, a wafer, having the same specification (the same masks, and the same layers) as that of the wafer to be polished, is polished and reference spectra, corresponding to different film thicknesses, are obtained in advance. The spectrum (i.e., the measurement spectrum) obtained at each point of time during polishing of a wafer is compared with the reference spectra in order to determine a reference spectrum that can minimize a difference between the measurement spectrum and the reference spectrum. The current film thickness is a film thickness corresponding to the determined reference spectrum. The difference between these two spectra may be the sum of absolute values of the difference in the light intensity at each of the wavelengths, or may be the sum of square difference in, the light intensity at each of the wavelengths. Each of the film thicknesses corresponding to each of the reference spectra can be determined by measuring the film thickness before and after polishing of the wafer and prorating film thicknesses under the assumption of a constant polishing rate.

The processor 45 then determines a difference ΔT between the film thickness TL0 obtained by the in-line film-thickness measuring device 80 and the film thickness IS0 obtained by the in-situ spectral film-thickness monitor 39. The film thickness TL0 and the film thickness IS0 represent those before polishing.

$$\Delta T = TL0 - TS0 \qquad (2)$$

The processor 45 corrects a film thickness TS, which is obtained at each point of time during polishing of the wafer by the in-situ spectral film-thickness monitor 39, with use of the following correction equation to determine a monitoring film thickness T.

$$T = TS + \Delta T \qquad (3)$$

Preferably, the film thickness TS at each point of time is also an average of the film thickness values measured by the film thickness sensor 40 under the condition that the film thickness TS can substantially reflect the film thickness over the entire circumference of the wafer, as shown in FIG. 11.

Generally, in the case of the above-discussed rotary-type polishing apparatus, the film thickness distribution in the circumferential direction of the wafer surface hardly change even after polishing. Moreover, in many cases, the polishing conditions (e.g., polishing pressure) adjusted so as to achieve a constant amount of polishing over the radial positions on the wafer surface. Therefore, during polishing, a film-thickness profile is approximately constant over the wafer surface, and a unique amount of correction ΔT may be determined with respect to all of the measurement points on the scanning paths of the film thickness sensor 40. In this case also, the monitoring film thickness that is consistent with the in-line film thickness measuring device 80 can be obtained during polishing. Even if the in-situ spectral film-thickness monitor 39 is deviated from the in-line film thickness measuring device 80 or may be deteriorated with time, or even if there is a variation in optical constant or thickness of an underlying layer between wafers, the reliable monitoring film thickness can, be obtained during polishing by correcting the film thickness as discussed above.

In a case where the amount of polishing varies depending on the radial position of the wafer (e.g., in a case where the profile control is performed so that the film thickness of the polished wafer becomes constant with respect to the radial direction regardless of an initial film thickness distribution), the measurement points of the in-situ spectral film-thickness monitor 39 may be divided into several groups in accordance with the radial position of the wafer, and the film thicknesses TS0, which represent film thicknesses before polishing, may be determined for the groups, respectively. In this case, multiple film thicknesses TL0 may also be obtained as average values in the respective groups by the in-line film thickness measuring device 80. If necessary, a certain process, such as an interpolation, may be performed on the measured values obtained at the respective measurement points before determining the film thicknesses TL0.

If an initial film-thickness profile, the thickness of the underlying layer, and an optical constant are substantially constant within one lot, the measurement of the initial film, thickness TL0 with use of the in-line film thickness measuring device 80 may be performed only on the first one of wafers. In contrast, if the initial profile and the thickness of the underlying layer vary from wafer to wafer in one lot, it is necessary to measure the initial film thickness TL0 with respect to each one of the wafers. Typically, wafers in one lot are those stored in one wafer cassette.

Figure 12:
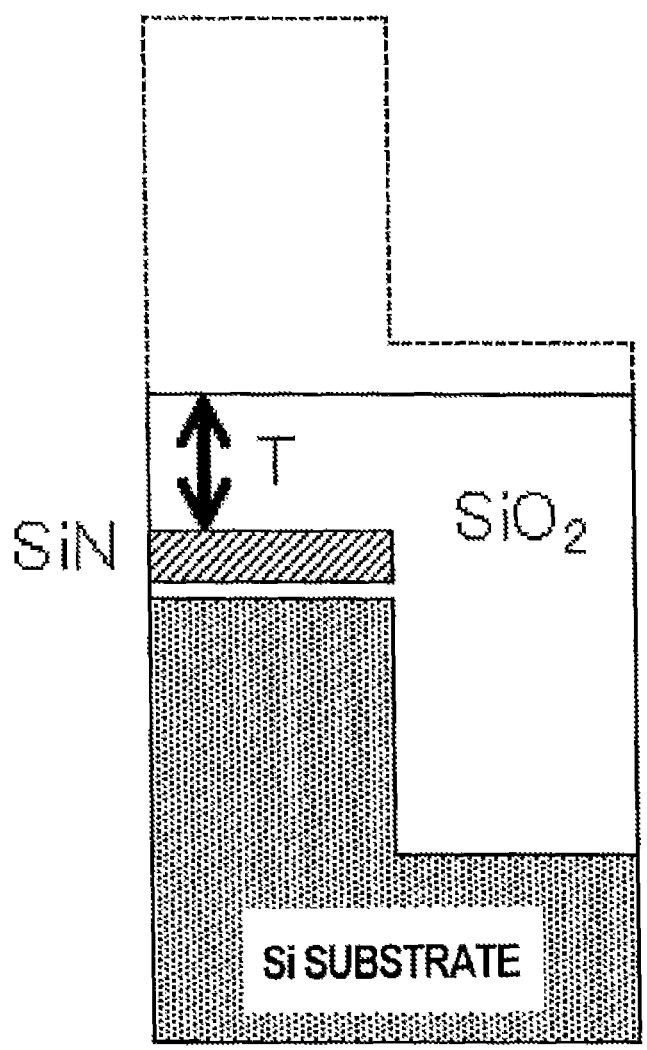
FIG. 12 is a cross-sectional view of a wafer.

Generally, when polishing a wafer, it is necessary to monitor a thickness of an uppermost film. If a different kind of film or interconnects exist underneath the uppermost film, it is important to monitor a thickness from a surface of the uppermost film to an interface between the uppermost film and the underlying different material, as illustrated by a sign T in FIG. 12. Therefore, the measurement of the initial film thickness (the film thickness before polishing) with use of the in-line film thickness measuring device 80 is performed on the uppermost film of such layer structures. Further, the in-situ spectral film-thickness monitor 39 also calculates the thickness of the uppermost film corresponding to this region.

In the example shown in FIG. 11, the film thickness sensor 40 scans the wafer surface evenly with respect to the circumferential direction while the polishing table 30A makes ten or five revolutions. Therefore, by averaging the film thickness values that have been obtained while the polishing table 30A makes ten or five revolutions, it is possible to obtain an average film thickness that does not depend on the film thickness distribution in the circumferential direction of the wafer surface.

However, in order to obtain the average film thickness, it is necessary to obtain film thickness data while the polishing table makes several revolutions and perform an averaging process, such as moving average, on the film thickness data. As a result, a time delay in the calculated film thickness occurs and excessive polishing or insufficient polishing may occur due to a change in the polishing rate.

Thus, in an embodiment, a rotational angle of the wafer when being polished determined in order to accurately obtain the film thickness distribution in the circumferential direction within the wafer surface and to monitor the progress of wafer polishing with no time delay. A typical polishing apparatus does not have any mechanism for synchronizing the rotational angles of the polishing table 30A and the top ring 31A or measuring the rotational angles thereof at every moment. Thus, in a method discussed below, a distinctive spectrum is extracted from the spectra obtained by the in-situ spectral film-thickness monitor 39, and the extracted spectrum is associated with a position information on the wafer surface.

Figure 13:
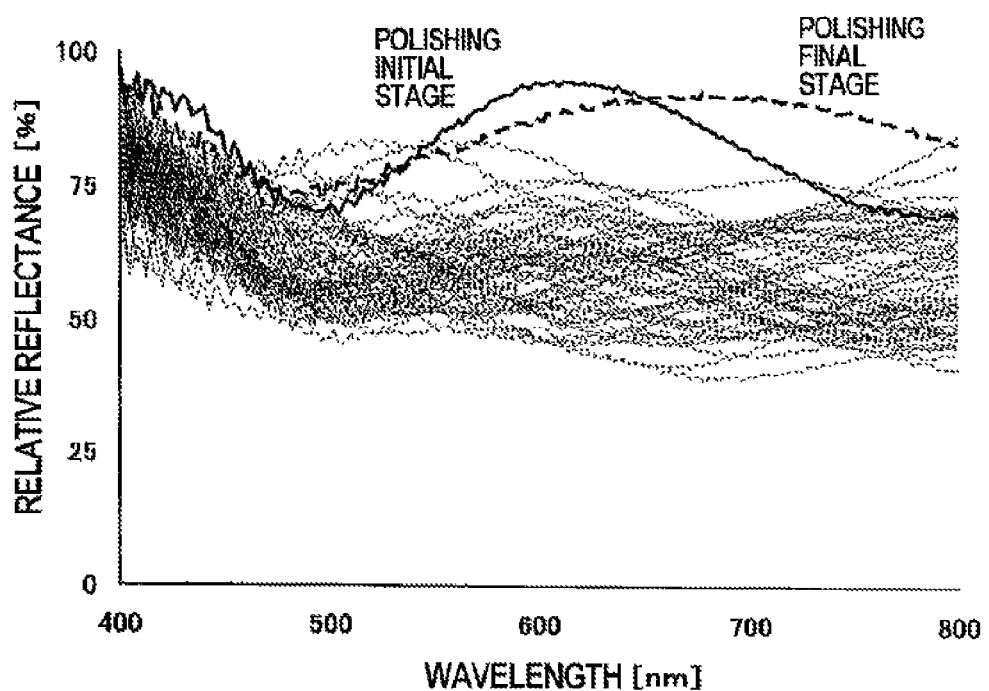
FIG. 13 is a graph showing spectra obtained at a measurement point located at a certain radial position of the wafer while the polishing table makes 60 revolutions.

In a patterned wafer, in many cases, there is a region where a single-layer oxide film is formed on a scribe line. A spectrum of the light reflected from this region differs greatly from the spectra obtained in patterned regions. FIG. 13 is a graph showing spectra obtained at a measurement point located at a certain radial position of the wafer while the polishing table 30A makes 60 revolutions. In this example, the in-situ spectral film-thickness monitor 39 has a halogen lamp as the light source, and the wafer surface was continuously irradiated with the light. In this graph, vertical axis represents the relative reflectance in which the intensity of the reflected light from a bare silicon is used as the reference intensity $B(\lambda)$ in the equation (1). Horizontal, axis of the graph represents the wavelength of the reflected light.

Figure 14:
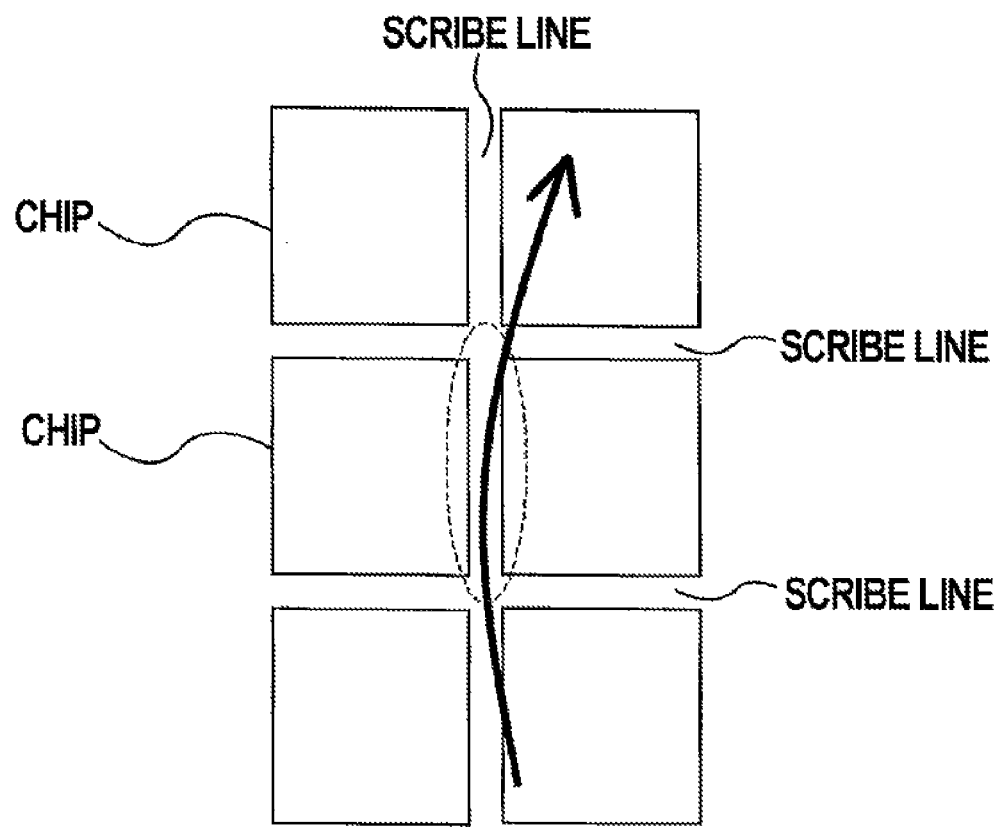
FIG. 14 is a view showing a manner in which a distal end of the film thickness sensor moves along a scribe line of the wafer.

In FIG. 13, spectra depicted by a thick solid line and a thick dotted line have the same shape and size as those of the spectra of the single-layer oxide film, while the other spectra depicted by thin dotted lines have different shape and size. The spectra (illustrated by the thick solid line and the thick dotted line), corresponding to the spectra of the single-layer oxide film, are obtained when the distal end of the film thickness sensor 40 moves along the scribe line as illustrated by dotted ellipse shown in FIG. 14. It is understood that the other spectra are obtained when the distal end of the film thickness sensor 40 moves over a chip or moves across the scribe line. In FIG. 13, it is possible to detect the spectra of the single-layer oxide film distinctively from the other spectra by establishing a condition in which the maximum value of the relative reflectance at a wavelength of 450 nm or more is not less than 90%.

Figure 15:
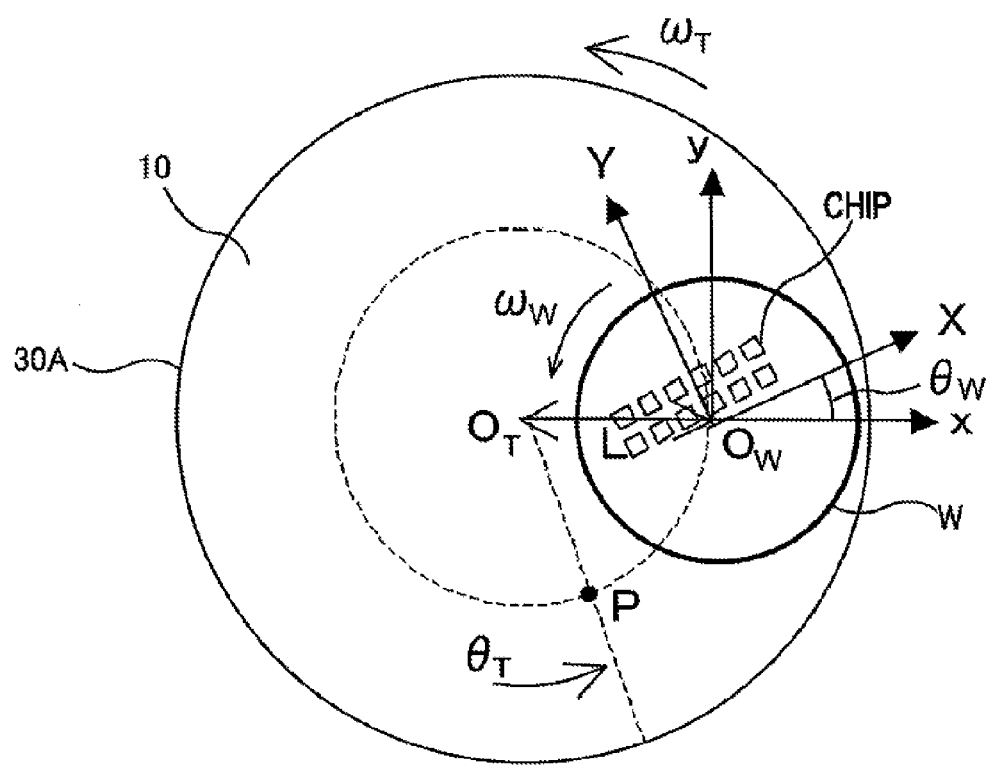
FIG. 15 is a diagram illustrating an example of a method of detecting the scribe line with use of the spectra obtained from the in-situ spectral film-thickness monitor and determining a rotational angle of the wafer.

With reference to FIG. 15, an example of the method of determining the rotational angle of the wafer by detecting the scribe line utilizing the spectrum obtained from the in-situ spectral film-thickness monitor 39 will be described. As shown in FIG. 15, a fixed coordinate system having its origin on a center $O_W$ of the wafer W is defined as a xy fixed coordinate system, and a rotating coordinate system having its origin on the center $O_W$ of the wafer W and rotating together with the wafer W is defined as a XY rotating coordinate system. The wafer W rotates about its own center $O_W$ in the counterclockwise direction, while the polishing table 30A rotates about its own center $O_T$ in the counterclockwise direction. The rotational angle, which will be discussed below, represents an angle from an x-axis positive direction.

Where a reference time 0 (which can be set arbitrary) of a point P (corresponding to the distal end of the film thickness sensor 40) on the polishing surface of the polishing pad 10 is defined as $\theta_{T0}$, the rotational angle at a certain time t is defined as $\theta_T$, and an angular velocity of the point P is defined as $\omega_T$, the point P (x, y) on the xy fixed coordinate system is represented as follows.

$$\theta_T = \theta_{T0} + \omega_T t \quad (4)$$

$$x = L \cos \theta_T - L \quad (5)$$

$$y = L \sin \theta_T \quad (6)$$

"L" represents a distance between the center $O_T$ of the polishing table 30A and the center $O_W$ of the wafer.

The XY rotating coordinate system is a coordinate system that rotates together with the wafer W. The XY rotating coordinate system has the origin $O_W$ on the center of the wafer W and has an X axis and a Y axis extending along orthogonal two sides of a chip on the wafer W. Where the rotational angles of the wafer W at the reference time and the time t are expressed as $\theta_{W0}$, $\theta_W$, respectively, and the angular velocity of the wafer W is expressed as $\omega_W$, the path of the point P (corresponding to the distal end of the film thickness sensor 40) on the wafer surface is expressed using the coordinates X, Y as follows.

$$\theta_W = \theta_{W0} \omega_W t \quad (7)$$

$$X = L\cos(\theta_T - \theta_W)L - L\cos\theta_W \quad (8)$$

$$Y = L\sin(\theta_T - \theta_W)L + L\sin\theta_W \quad (9)$$

$$X^2 + Y^2 = 2L^2(1 - \cos\theta_T) \quad (10)$$

From the equation (8) and the equation (9), the following equations are derived.

$$\frac{dX}{dt} = L(\omega_T - \omega_W)\sin(\theta_T - \theta_W) + L\omega_W \sin\theta_W \quad (11)$$
$$= (A\cos\theta_T + B)\sin\theta_W - A\sin\theta_T \cos\theta_W$$
$$= C\sin(\theta_W + \varphi)$$

$$\frac{dY}{dt} = L(\omega_T - \omega_W)\cos(\theta_T - \theta_W) + L\omega_W \cos\theta_W \quad (12)$$
$$= (A\cos\theta_T + B)\cos\theta_W + A\sin\theta_T + \sin\theta_W$$
$$= C\sin(\theta_W + \varphi)$$

where $$A = L(\omega_T - \omega_W) \quad (13)$$

$$B = L\omega_W \quad (14)$$

$$C = \sqrt{A^2 + B^2 + 2AB\cos\theta_T} \quad (15)$$

$$\cos\varphi = (A\cos\theta_T + B)/C \quad (16)$$

$$\sin\varphi = -A\sin\theta_T/C \quad (17)$$

$$\sin\psi = \cos\varphi, \cos\psi = -\sin\varphi \quad (18)$$

The equation (18) gives $$\psi = \varphi + \pi/2 \quad (19)$$

If the spectrum corresponding to the single-layer oxide film on the scribe line is detected, an equation dX/dt=0 or dY/dt=0 holds. Therefore, the rotational angle $\theta_W$ of the wafer at this point of time is expressed from the equations (11), (12), (19) as follows.

$$\theta_W = -\varphi + n\pi/2 (n=0, 1, 2, \text{ or } 3) \quad (20)$$

The angle $\varphi$ is determined by the equation (16) and the equation (17). If "n" is 0 or 2, the point. P moves on the wafer surface along the X axis, and if "n" is 1 or 3, the point P moves along the Y axis. Assuming that the angular velocities $\omega_T$, $\omega_W$ of the polishing table 30A and the top ring 31A are constant during polishing, $\theta_W$, which is given by the equation (20), is a function that has only independent variables n and $\theta_T$.

Figure 16:
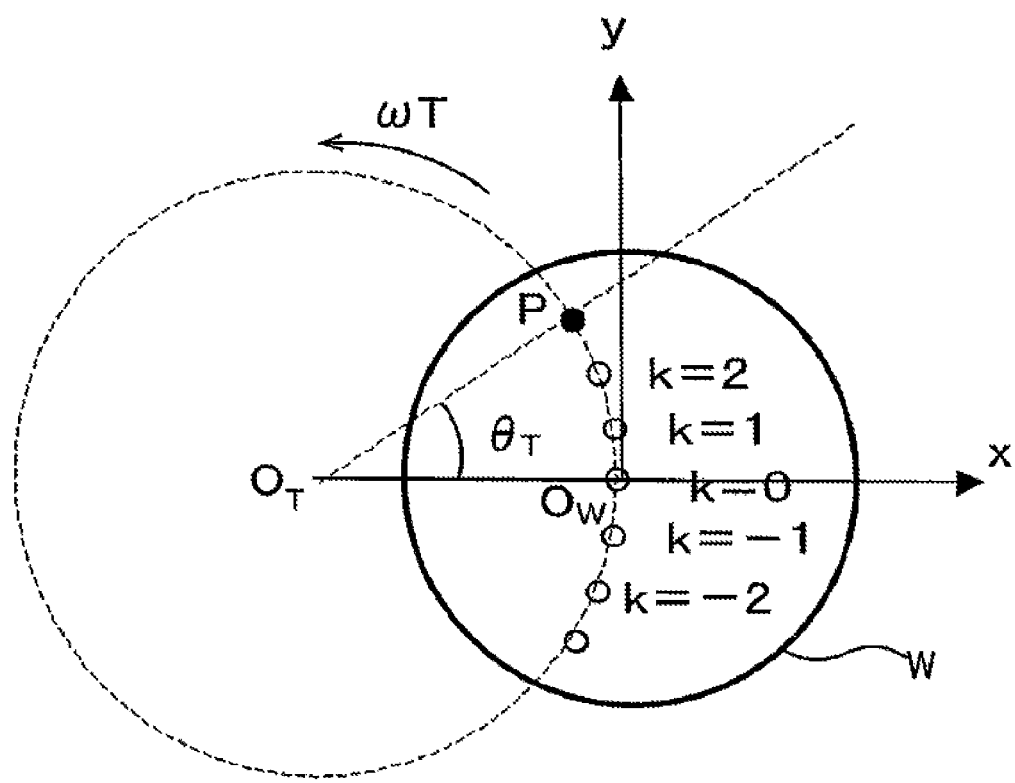
FIG. 16 is a diagram showing measurement points while the polishing table makes one revolution.

During polishing of the wafer, the measurement timings are adjusted such that a measurement cycle S of the spectrophotometer (or spectrometer) 44 is constant and the film thickness sensor 40 measures the wafer center each time the polishing table 30A makes one revolution (see Japanese laid-open patent publication No. 2004-154928). Measurement points k during one revolution of the polishing table 30A are numbered in order of measurement time, as shown in FIG. 16, wherein a measurement point on the wafer center is numbered 0.

$$k = \ldots -2, -1, 0, 1, 2, \ldots$$

The rotational angle $\theta_T$ of the measurement point k is determined as $$\theta_T = kS\omega_T \quad (21)$$

where S is a measurement cycle of the spectrophotometer 44.

Accordingly, with use of the equation (21), the rotational angle of the point P is uniquely determined from the number of the measurement point at which the in-situ spectral film-thickness monitor 39 has detected the scribe line. Therefore, four rotational angles $\theta_W$ of the wafer are determined from the equation (20). Further, the coordinate values (X, Y) of the four measurement points on the wafer surface are calculated from the equations (8), (9).

Figure 17:
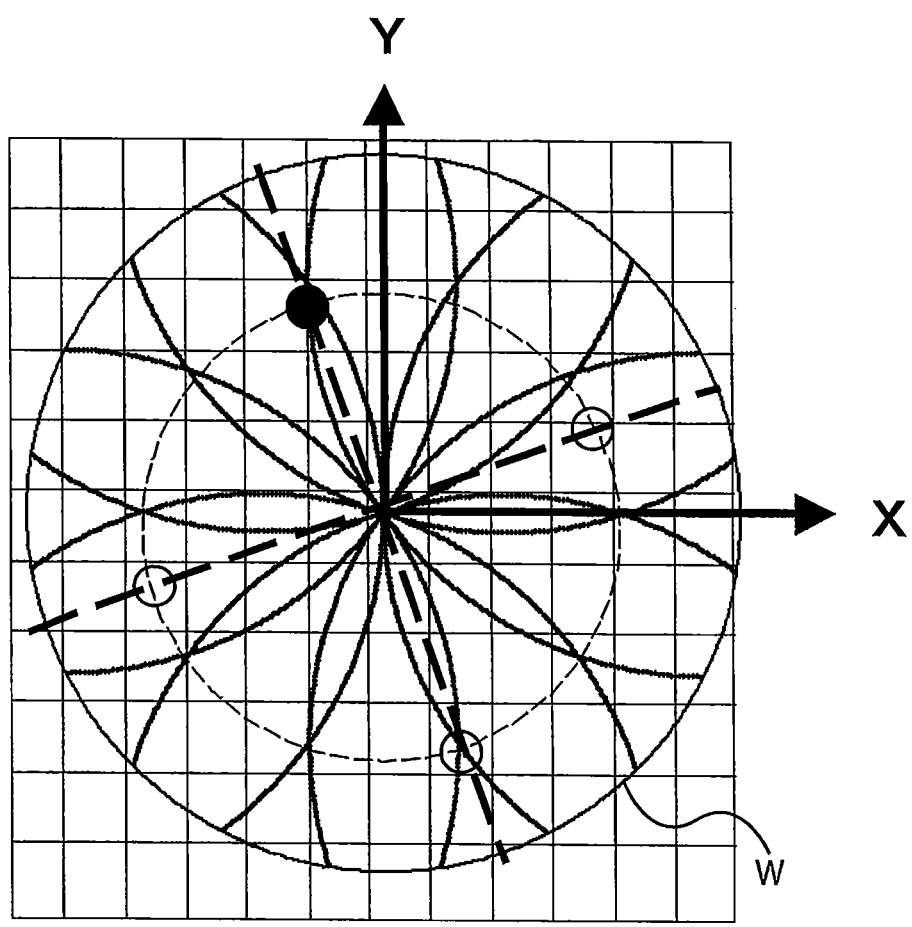
FIG. 17 is a diagram showing four measurement points when the in-situ spectral film-thickness monitor has detected the scribe line.

In FIG. 17, the coordinate values of the for measurement points that have been calculated in this manner are shown by black circle ● and while circle ○. An inside dotted circle is a circle defined by the equation (10), and grid lines represent the scribe lines on the wafer surface. The coordinate values are compared with the arrangement of the scribe line on the wafer surface, so that the coordinate values of the measurement point at this point of time can be determined. In FIG. 17, a point (illustrated by the black circle ●) in a second quadrant indicates a position of the measurement point when the distal end of the film thickness sensor 40 is moving along the scribe line in the Y direction.

In FIG. 17, a point (illustrated by the white circle ○) in a first quadrant or a third quadrant is located on the scribe line extending in the X direction only in a limited case where the size and the arrangement of the chips are special. Typically, the wafer center is not located on a grid point at which the scribe lines intersect, and a point in a fourth quadrant that is symmetric about the center of the wafer does not exist on the scribe line extending in the Y direction. Therefore, in many cases, the coordinate values of the measurement point when the scribe line is detected are uniquely determined.

Simultaneously, the integer "n" of the equation (20) and the rotational angle $\theta_W$ are uniquely determined. Further, the rotational angle $\theta_{W0}$ of the wafer at the reference time is uniquely determined from the equation (7). Once the rotational angle $\theta_{W0}$ of the wafer at the reference time is determined, the rotational angle $\theta_W$ of the wafer at an arbitrary time that is later than a current time can be determined from the equation (7). In addition, the measurement point P (x, y) that is expressed by the equation (5), the equation (6), and the equation (21) can be converted into the coordinate values (X, Y) on the wafer surface by the equation (8) and the equation (9).

The scanning path of the film thickness sensor 40 described on the wafer surface shown in FIG. 17 is a path in the case where the polishing table 30A rotates at a rotational speed of 60 min$^{-1}$ and the top ring 31A rotates at a rotational speed of 66 min$^{-1}$. When the film thickness sensor 40 scans the wafer surface evenly within a short period of time as in this case, the in-situ spectral film-thickness monitor 39 can obtain the measured values of the film thickness over the entire wafer surface within a short period of time (e.g., while the polishing table 30A makes five revolutions or ten revolutions). Therefore, so long as the polishing rate is stable, it is possible to convert the film thickness value at each measurement point (region) within this period of time into a film thickness value at a point of time (e.g., a point of time when the last spectrum is measured within the period of time) based on the polishing rate. Accordingly, the polishing end point detection can be performed under more fine conditions. For example, a threshold value may be provided for a minimum film thickness over the entire wafer surface so as to determine the polishing end point, or polishing of the wafer may be terminated if the film thickness values of a predetermined percentage of the total decrease below a threshold value. Further, interpolation may be performed in order to obtain the film thickness values at the measurement points corresponding to those of the in-line film-thickness measuring device 80 so that the monitoring film thickness can be obtained at locations that completely correspond to film-thickness management points before and after polishing.

In the meantime, even in the case where the polishing table 30A rotates at a rotational speed of 60 min$^{-1}$ and the top ring 31A rotates at a rotational speed of 66 min$^{-1}$ as shown in FIG. 17 in order for the film thickness sensor 40 to scan the wafer evenly with respect to the circumferential direction of the wafer within a relatively short period of time, the film thickness sensor 40 can scan the wafer surface in various directions in accordance with the radial position on the wafer (i.e., the distance from the wafer center) and the rotation of the polishing table 30A.

Figure 18:
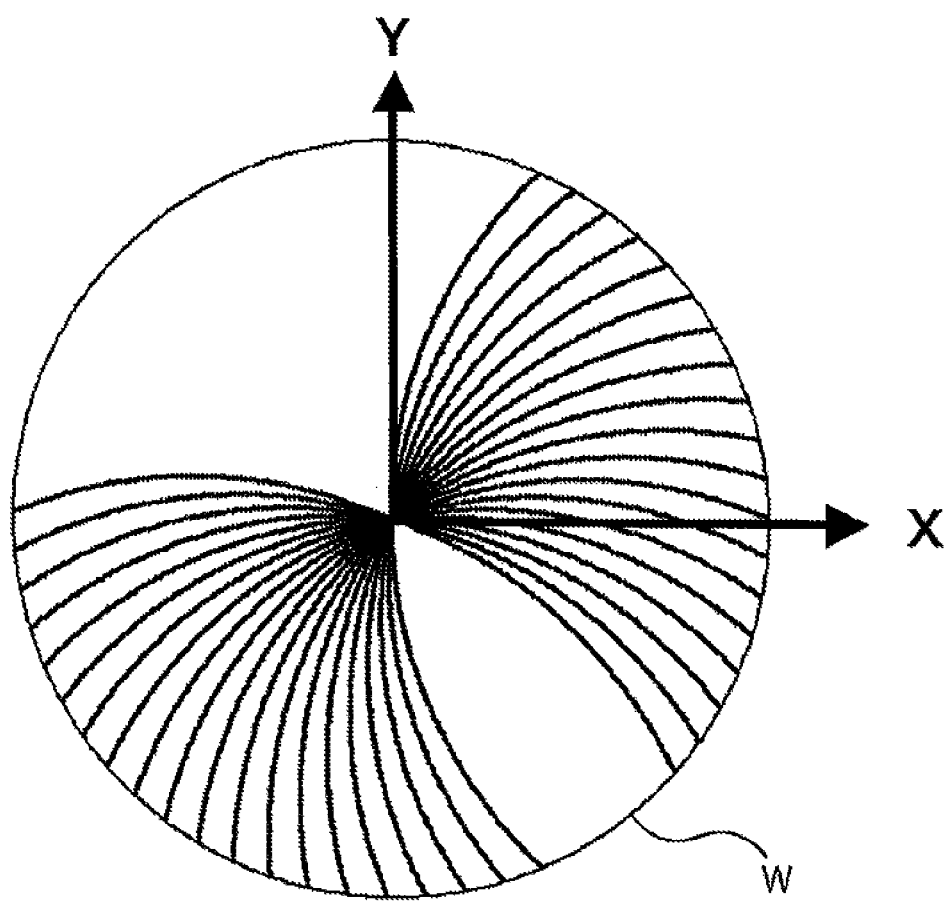
FIG. 18 is a diagram showing scanning paths of the film thickness sensor in a case where the polishing table rotates at a rotational speed of 60 $min^{-1}$ and a top ring rotates at a rotational speed of 61 $min^{-1}$.

However, if the polishing table 30A rotates ten revolutions, for example, the measurement points are returned to their initial positions, and the paths of the measurement points on the wafer surface become sparse. As a result, if the chip has a relatively huge size, the scribe line may not be detected in some rotational angles of the top ring 31A at the reference time. In such a case, as shown in FIG. 18, the rotational speed of the polishing table 30A and the rotational speed of the top ring 31A are set to be slightly different from each other so that the scanning path of the film thickness sensor 40 varies gradually. With this operation, it is possible to ensure the detection of the scribe line. FIG. 18 shows the scanning paths of the film thickness sensor 40 described on the wafer surface when the polishing table 30A rotates at a rotational speed of 60 min$^{-1}$ and the top ring 31A rotates at a rotational speed of 61 min$^{-1}$.

Further, before slurry-polishing of the wafer is performed, a water-polishing step may be performed so that the scribe line is detected. The water polishing is a process of polishing the wafer while supplying pure water, instead of the slurry, onto the polishing pad 10. During this water polishing process, polishing of the wafer does not substantially progress.

Depending on the rotational speed of the polishing table 30A and the width of the scribe line, the measurement cycle of the film thickness is preferably set to be short to a certain degree (e.g., 3 milliseconds) so that a length of one measurement point (i.e., one measurement zone) is several millimeters.

The above-discussed method employs the step of detecting the rotational angle of the wafer based on the spectrum that is obtained when the film thickness sensor 40 scans the wafer surface along the scribe line. However, such an event can occur several times during polishing and can occur at several regions in the wafer surface. On the other hand, the wafer may be displaced slightly in the rotating direction in the top ring 31A, possibly resulting in a difference in the rotational angle between the wafer and the top ring 31A.

Thus, during polishing, the detection of the scribe line is performed continuously, while the coordinates of the measurement point on the wafer surface and the rotational angle of the wafer are determined. Further, the rotational angle of the wafer corresponding to the reference time is calculated. With respect to the rotational angle of the wafer corresponding to the reference time, the value thereof that has been obtained in a previous detection of the scribe line is updated successively.

Once the rotational angle $\theta_{W0}$ of the wafer corresponding to the reference time is determined at a certain point of time when polishing of the wafer is being performed, the rotational angle $\theta_W$ of the wafer at a point of time that is later than that point of time can be calculated as described previously. Further, the coordinate values (X, Y) of the measurement point on the wafer surface at that point of time can also be calculated.

Figure 19:
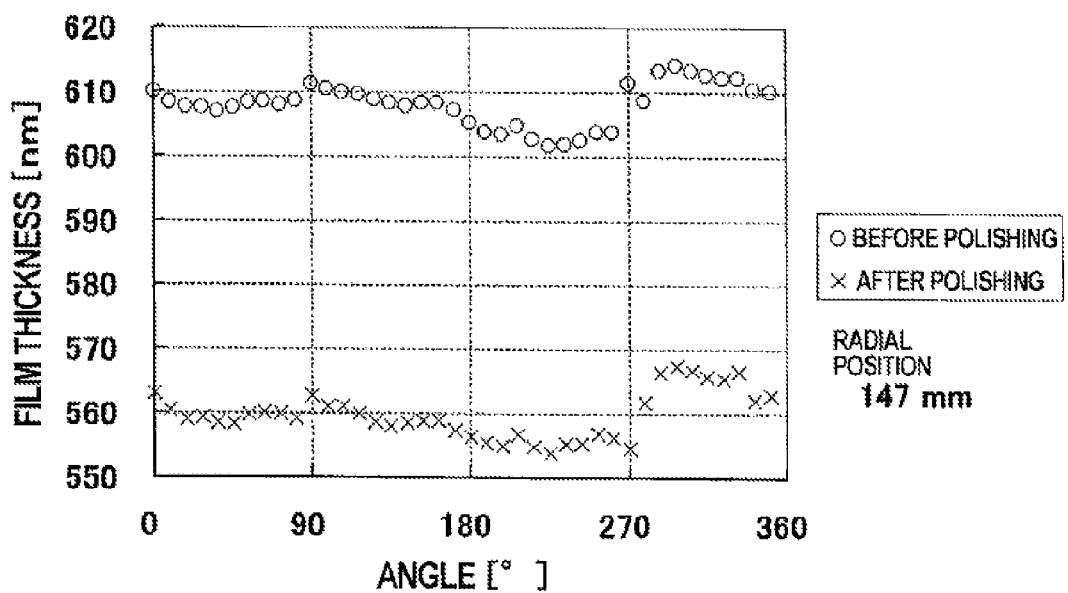
FIG. 19 is a graph showing a film-thickness distribution along a circumferential direction of the wafer before and after polishing.

FIG. 19 is a graph showing a film-thickness distribution along the circumferential direction of the wafer before and after polishing. As can be seen from FIG. 19, the film-thickness distribution in the circumferential direction of the wafer surface is approximately constant during polishing. Thus, assuming that the film-thickness distribution in the circumferential direction is constant, it is possible to estimate the film-thickness distribution in the circumferential direction of the wafer surface at a certain radial position of the wafer during polishing by determining the coordinate values (X, Y) of the measurement points on the wafer surface as discussed above, with use of the film thickness values obtained by the in-situ spectral film-thickness monitor 39 and the film-thickness distribution that has been obtained before polishing by the in-line film-thickness measuring device 80. Therefore, an average of the film thicknesses along the circumferential direction of the substrate at this radial position can be calculated without a time delay. Further, the film thickness with respect to all of the measurement points arrayed in approximately the radial direction on the wafer surface may be determined, and the film-thickness distribution in the circumferential direction at each of these measurement points may be estimated. With these operations, it is possible to estimate the film-thickness distribution over the wafer surface in its entirety every time the polishing table 30A makes one revolution. Accordingly, the polishing end point detection can be performed under more fine conditions. For example, a threshold value may be provided for a minimum film thickness over the entire wafer surface so as to determine the polishing end point, or polishing of the wafer may be terminated if the film thickness values of a predetermined percentage of the total decrease below a threshold value. Further, interpolation may be performed in order to obtain the film thickness values at the measurement points corresponding to those of the in-line film-thickness measuring device 80 so that the monitoring film thickness can be obtained at locations that completely correspond to film-thickness management points before and after polishing.

Figure 20:
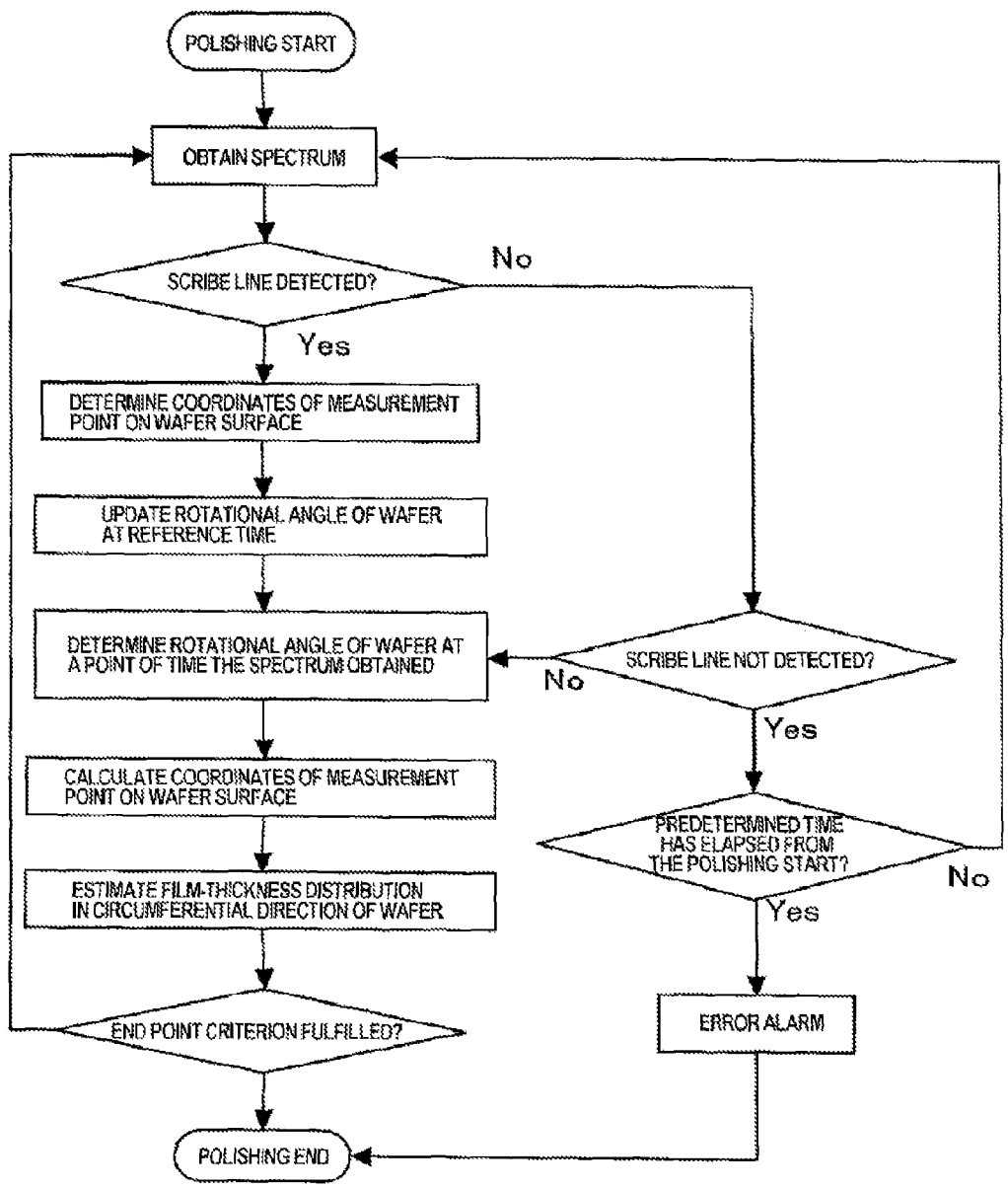
FIG. 20 is flowchart showing an embodiment.

Depending on the chip size, the width of the scribe line, and an occupancy of the single-layer oxide film on the scribe line, there is a possibility of failing in the detection of the scribe line. If the scribe line cannot be detected after a predetermined time has elapsed, an alarm may be emitted or the polishing operation may be stopped as an abnormal situation has occurred. This flow is described in FIG. 20.

Even in the case of using only the in-situ spectral film-thickness monitor 39, it is possible to substantially remove the variation in the film thickness along the circumferential direction by calculating the average of the film thickness values that have been obtained while the scanning path of the film thickness sensor 40 makes approximately one revolution on the wafer surface. However, this method entails a time delay in obtaining the average film thickness value in accordance with the scanning time of the film thickness sensor 40. Such a time delay can be eliminated by using both the data of the in-line film-thickness measuring device 80 and the data of the in-situ spectral, film-thickness monitor 39. As a result, the polishing end point can be detected in a timely manner. The same applies to the case where a real-time control is performed on the film-thickness distribution in the radial direction of the wafer surface. A timely control with no time delay can be realized by determining the film thickness that is an average with respect to the circumferential direction regardless of the variation in the film thickness along the circumferential direction.

The method of determining the rotational angle of the wafer based on the detection of the scribe line is not limited to the detection of the above-described single-layer oxide film, so long as the spectrum of the reflected light on the wafer surface is distinctive. For example, a multilayer film with no patterns on the scribe line may be the object of the detection.

Figure 21A:
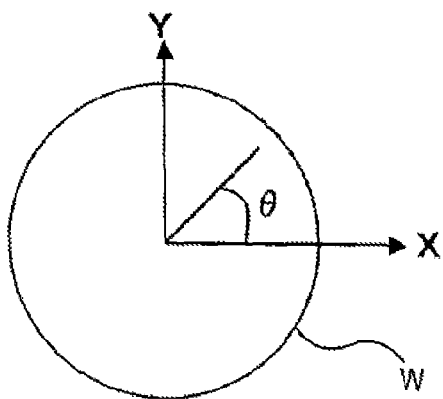
FIG. 21A, FIG. 21B, and FIG. 21C are diagraphs showing another method of determining the rotational angle of the wafer.
Figure 21B:
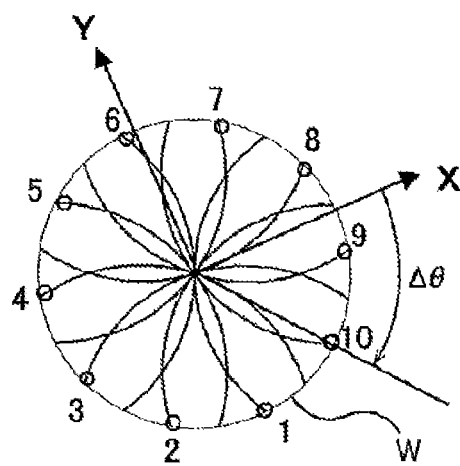
Figure 21C:
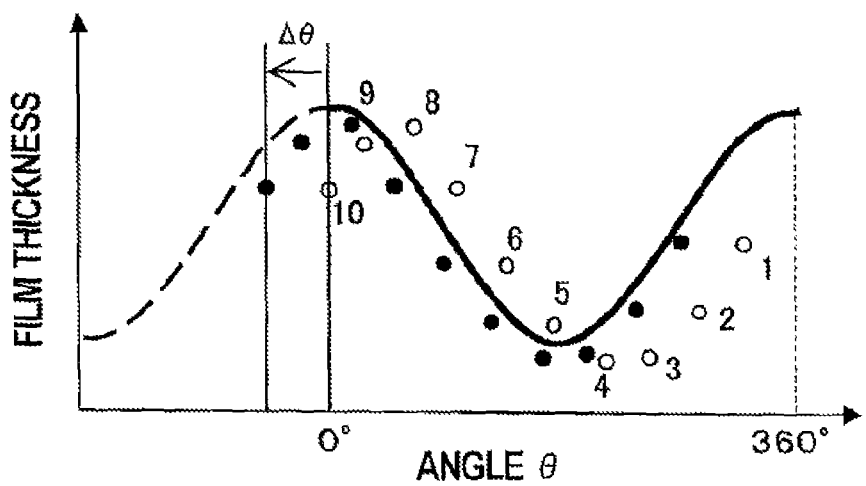

FIG. 21A through FIG. 21C show another method for determining the rotational angle $\theta_W$ of the wafer. In FIG. 21C, with respect to the angle $\theta$ shown in FIG. 21A, the film thicknesses of the peripheral portion of the wafer that have been measured by the in-line film-thickness measuring device 80 before polishing are interpolated from the film thickness values at neighboring, measurement points, so that the film, thicknesses are expressed as a curved line, in this example, the film thickness is maximized in the positive direction of the X axis on the wafer surface, while the film thickness is minimized in the negative direction of the X axis.

In contrast, FIG. 21B shows the scanning paths of the film thickness sensor 40 of the in-situ spectral film-thickness monitor 39 described on the wafer surface when the polishing table 30A rotates at a rotational speed of 60 min$^{-1}$ and the top ring 31A rotates at a rotational speed of 66 min$^{-1}$. The film thickness sensor 40 is plunged into the wafer surface at positions shown by No. 1 to No. 10 in order of No. 1 to No. 10. The first measurement point after the sensor has plunged into the wafer surface is indicated by the white circle ○. The film thickness values obtained during ten rotations after the polishing start are shown by the white circles ○ in FIG. 21C. In this example, the path rotates with time in the clockwise direction on the surface and the angle decreases. Therefore, the film thickness values are shown in the order opposite to the measurement order, i.e., No. 10 corresponds to $\theta=0$. These film thickness values may be converted into initial values (representing the film thicknesses before polishing) based on the estimated polishing rate and the elapsed time from the polishing start point at each of the measurement points.

Now, the rotational angle of the wafer when the in-situ spectral film-thickness monitor 39 measures the film thickness is unknown, and in FIG. 21C, there is a difference in angle between the film thickness value, which is represented by the solid line, obtained by the in-line film-thickness measuring device 80 and the film thickness value, which is represented by the white circle ○, obtained by the in-situ spectral film-thickness monitor 39. Thus, the film thickness values obtained by the in-situ spectral film-thickness monitor 39 are translated along the horizontal axis (θ axis) to determine a point at which the film thickness values obtained by the in-situ spectral film-thickness monitor 39 are the closest to the film thickness values obtained by the in-line film-thickness measuring device 80. Specifically, a point at which the sum of the square difference between the film thickness values of No. 1 to No. 10 and the film thickness values obtained by the in-line film-thickness measuring device 80, or the sum of absolute values of the difference is minimized is determined. Where an amount of translation along the horizontal axis is represented by $\Delta\theta$, this $\Delta\theta$ represents the rotational angle $\theta_W$ of the wafer with respect to the first measurement point on the path No. 10. That is, the rotational angle $\theta_W$ of the wafer is equal to the amount of translation $\Delta\theta$ (a negative value in this example) of the film thickness values ($\theta_W=\Delta\theta$).

The example discussed above focuses on the film thickness of the peripheral portion of the wafer and is directed to the first measurement points on the paths No. 1 to No. 10 of the film thickness sensor 40 of the in-situ spectral film-thickness monitor. It is noted that the film-thickness measurement point (the radial position) to be compared is not limited to this example. Further, although the above-discussed example is directed to the method including the step of comparing the film-thickness distribution in the circumferential direction at the initial polishing stage with the film thickness before polishing obtained by the in-line film-thickness measuring device 80 to determine the rotational angle of the wafer, it is also possible to determine the rotational angle of the wafer not only in the initial polishing stage, but also in any time during polishing, because the film-thickness distribution in the circumferential direction is considered to be approximately constant during polishing, as shown in FIG. 19. At this time, the film-thickness distribution in the circumferential direction, obtained by both the in-situ spectral film-thickness monitor 39 and the in-line film-thickness measuring device 80, may be divided by an average, respectively, so as to be normalized to adjust average thickness, so that more accurate determination of the rotational angle is expected.

In this method, it is necessary to adjust a ratio of the rotational speed of the polishing table 30A to the rotational speed of the top ring 31A such that the scanning path of the film thickness sensor 40 rotates on the wafer one time within a short period of time. Further, in the previously-discussed method of detecting the scribe line, the rotational angle of the top ring 31A cannot be obtained until the film thickness sensor 40 scans along the scribe line for the first time. In contrast, according to this method, the rotational angle can be obtained continuously from the initial polishing stage. It is possible to use both this method and the previously-discussed method.

Although the preferred embodiments of the present invention have been described above, it should be understood that the present invention is not limited to the above embodiments, but various changes and modifications may be made to the embodiments without departing from the scope of the appended claims.

What is claimed is:

1. A polishing apparatus, comprising:
a polishing table for supporting a polishing pad;
a table motor configured to rotate the polishing table;
a top ring configured to press a substrate against the polishing pad;
a top ring motor configured to rotate the top ring;
a film thickness sensor disposed in the polishing table, the film thickness sensor being configured to continuously direct light to measurement points on the substrate each time the polishing table makes one revolution, receive reflected light from the substrate, and measure intensity of the reflected light at each of wavelengths, the measurement points being distributed in a radial direction of the substrate; and;

a processor configured to produce spectra each comprising a spectral waveform representing a relationship between the intensity and the wavelength of the reflected light from the substrate, extract, from the spectra, a spectrum of the reflected light from a scribe line of the substrate, calculate an angle of rotation of the substrate around a center of the substrate using the spectrum extracted, determine plural sets of coordinates X, Y of the measurement points on an XY rotating coordinate system using the calculated angle of rotation, the XY rotating coordinate system being predefined on a surface of the substrate and having an origin on a center of the substrate, determine film thicknesses at the measurement points from the spectra, assign a film-thickness distribution along a circumferential direction of the substrate to each of the measurement points to determine an entire film-thickness distribution over the entirety of the substrate, and determine a polishing end point based on the entire film-thickness distribution.

2. The polishing apparatus according to claim 1, further comprising:

an in-line film-thickness measuring device configured to measure a film thickness of the substrate when the substrate is in a stationary state, wherein the processor is configured to obtain a second film-thickness distribution along a circumferential direction of the substrate and compare the second film-thickness distribution with a first film-thickness distribution along the circumferential direction of the substrate, obtained by the processor, to determine the rotational angle of the substrate.

3. The polishing apparatus according to claim 1, wherein the processor is configured to obtain multiple film thicknesses along a circumferential direction of the substrate at a predetermined radial position of the substrate at each point of time during polishing and calculate an average of the multiple film thicknesses.

4. The polishing apparatus according to claim 1, wherein the film thickness sensor includes a light source configured to continuously direct light to the measurement points, and a spectrophotometer configured to receive reflected light from the substrate and measure intensity of the reflected light at each of wavelengths.

5. The polishing apparatus according to claim 1, further comprising:

an in-line film-thickness measuring device configured to obtain an initial film-thickness distribution along the circumferential direction of the substrate before polishing of the substrate, wherein the processor assigns a film-thickness distribution along the circumferential direction of the substrate to each of the measurement points based on the initial film-thickness distribution to determine an entire film-thickness distribution over the entirety of the substrate.

6. The polishing apparatus according to claim 1, wherein the XY rotating coordinate system has an X axis and a Y axis, one of which extending parallel with the scribe line.

7. The polishing apparatus according to claim 6, wherein the angle of rotation of the substrate is an angle of the X axis of the XY rotating coordinate system from an x axis of an xy fixed coordinate system having its origin on the center of the substrate.

8. A polished-state monitoring method, comprising:

rotating a substrate around a center of the substrate while rotating a polishing table;

pressing the substrate against a polishing pad on the polishing table;

continuously directing light to measurement points on the substrate each time the polishing table makes one revolution, the measurement points being distributed in a radial direction of the substrate;

receiving reflected light from the substrate;

measuring intensity of the reflected light at each of wavelengths;

producing spectra each comprising a spectral waveform representing a relationship between the intensity and the wavelength of the reflected light from the substrate;

extracting, from the spectra, a spectrum of the reflected light from a scribe line of the substrate;

calculating an angle of rotation of the substrate around the center of the substrate using the spectrum extracted;

determining plural sets of coordinates X, Y of the measurement points on an XY rotating coordinate system using the calculated angle of rotation, the XY rotating coordinate system being predefined on a surface of the substrate and having an origin on a center of the substrate;

determining film thicknesses at the measurement points from the spectra assigning a film-thickness distribution along a circumferential direction of the substrate to each of the measurement points to determine an entire film-thickness distribution over the entirety of the substrate; and determining a polishing end point based on the entire film-thickness distribution.

9. The polished-state monitoring method according to claim 8, further comprising:

before polishing of the substrate, measuring the film thickness of the substrate when the substrate is in a stationary state to obtain a first film-thickness distribution along a circumferential direction of the substrate; and when polishing the substrate, obtaining a second film-thickness distribution along the circumferential direction of the substrate based on the film thickness determined from the spectra, wherein determining the angle of rotation of the substrate comprises determining the angle of rotation of the substrate by comparing the second film-thickness distribution with the first film-thickness distribution.

10. The polished-state monitoring method according to claim 8, further comprising:

obtaining multiple film thicknesses along a circumferential direction of the substrate at a predetermined radial position of the substrate at each point of time during polishing; and calculating an average of the multiple film thicknesses.

11. The polished-state monitoring method according to claim 8, further comprising:

obtaining an initial film-thickness distribution along the circumferential direction of the substrate before polishing of the substrate, wherein said assigning comprises assigning a film-thickness distribution along the circumferential direction of the substrate to each of the measurement points based on the initial film-thickness distribution to determine an entire film-thickness distribution over the entirety of the substrate.

12. The polished-state monitoring method according to claim 8, wherein the XY rotating coordinate system has an X axis and a Y axis, one of which extending parallel with the scribe line.

13. The polished-state monitoring method according to claim 12, wherein the angle of rotation of the substrate is an angle of the X axis of the XY rotating coordinate system from an x axis of an xy fixed coordinate system having its origin on the center of the substrate.

* * * * *